(12) United States Patent
Yoshioka et al.

(10) Patent No.: US 12,028,290 B2
(45) Date of Patent: Jul. 2, 2024

(54) USER TERMINAL AND RADIO COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP); Shaozhen Guo, Beijing (CN); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 344 days.

(21) Appl. No.: 17/609,625

(22) PCT Filed: May 9, 2019

(86) PCT No.: PCT/JP2019/018613
§ 371 (c)(1),
(2) Date: Nov. 8, 2021

(87) PCT Pub. No.: WO2020/225917
PCT Pub. Date: Nov. 12, 2020

(65) Prior Publication Data
US 2022/0239445 A1    Jul. 28, 2022

(51) Int. Cl.
*H04L 5/00* (2006.01)
*H04L 1/1607* (2023.01)
(Continued)

(52) U.S. Cl.
CPC .......... *H04L 5/0055* (2013.01); *H04L 1/1671* (2013.01); *H04L 1/1812* (2013.01); *H04W 72/1273* (2013.01)

(58) Field of Classification Search
CPC ... H04L 5/0055; H04L 1/1671; H04L 1/1812; H04L 1/1607; H04L 1/1829;
(Continued)

(56) References Cited

U.S. PATENT DOCUMENTS

| 2019/0028242 A1* | 1/2019 | Xiao | H04L 1/1607 |
| 2020/0008228 A1 | 1/2020 | Lee et al. | |
| 2020/0228289 A1* | 7/2020 | He | H04L 1/1861 |

FOREIGN PATENT DOCUMENTS

| WO | 2018/064313 A1 | 4/2018 | |
| WO | WO-2018064313 A1 * | 4/2018 | ........... H04L 27/261 |

OTHER PUBLICATIONS

International Search Report issued in PCT/JP2019/018613, mailed on Dec. 10, 2019 (4 pages).

(Continued)

*Primary Examiner* — Hardikkumar D Patel
(74) *Attorney, Agent, or Firm* — Osha Bergman Watanabe & Burton LLP

(57) ABSTRACT

A user terminal according to an aspect of the present disclosure includes a control section that generates a Hybrid Automatic Repeat reQuest ACKnowledgement (HARQ-ACK) codebook containing only HARQ-ACK corresponding to a semi-persistent scheduling (SPS) downlink shared channel (Physical Downlink Shared Channel (PDSCH)), so that HARQ-ACK bits corresponding to the PDSCH each SPS are ordered in accordance with a given rule, and a transmitting section that transmits an HARQ-ACK information bit corresponding to the HARQ-ACK codebook by using an uplink control channel resource based on an SPS corresponding to HARQ-ACK at a specific location in the order. According to an aspect of the present disclosure, it is possible to feed back HARQ-ACK appropriately even when a plurality of SPSs is utilized.

5 Claims, 18 Drawing Sheets

(51) Int. Cl.
  *H04L 1/1812* (2023.01)
  *H04W 72/1273* (2023.01)
(58) Field of Classification Search
  CPC ............ H04L 1/1861; H04W 72/1273; H04W 72/0446; H04W 72/23; H04W 28/06
  See application file for complete search history.

(56) References Cited

OTHER PUBLICATIONS

Written Opinion of the International Searching Authority issued in PCT/JP2019/018613, mailed on Dec. 10, 2019 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-Utran); Overall description; Stage 2 (Release 8)"; Mar. 2010 (149 pages).
NTT DOCOMO, Inc.; "Physical layer enhancements for DL SPS"; 3GPP TSG RAN WG1 #97, R1-1906219; Reno, USA, May 13-17, 2019 (8 pages).
Office Action in counterpart Russian Patent Application No. 2021134006 issued on Aug. 9, 2022 (12 pages).

\* cited by examiner

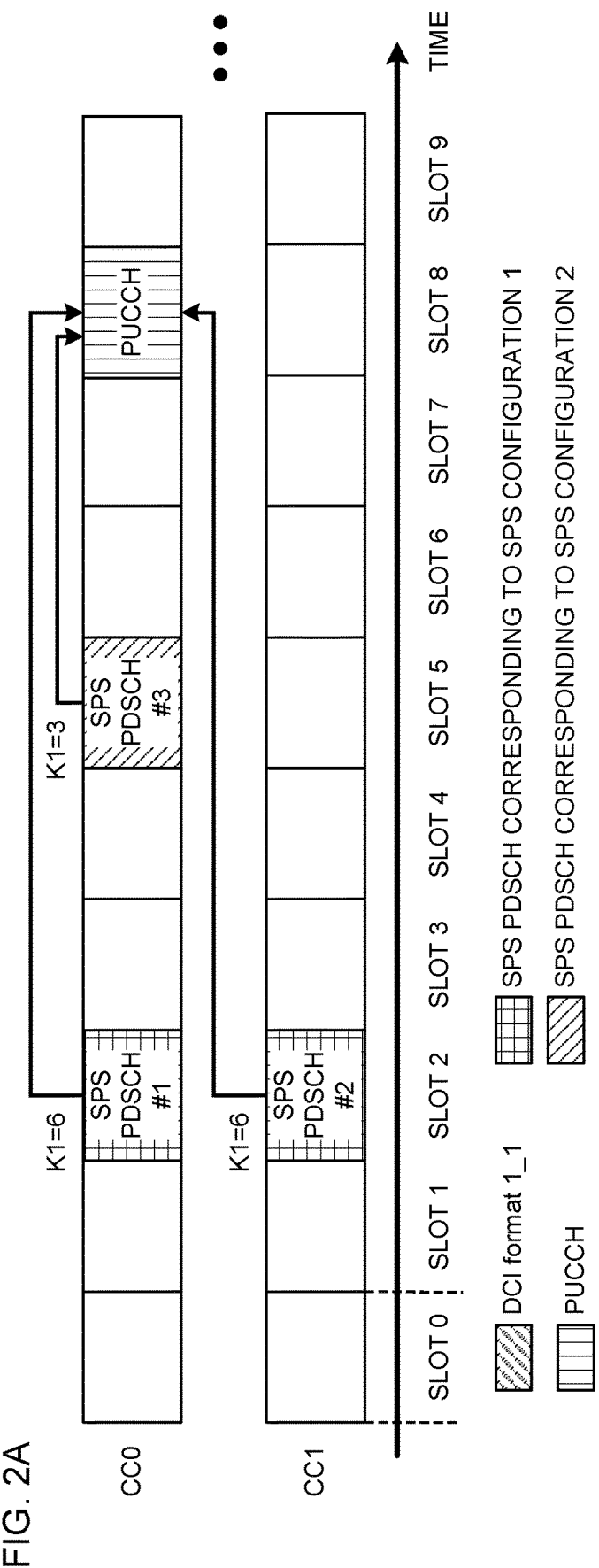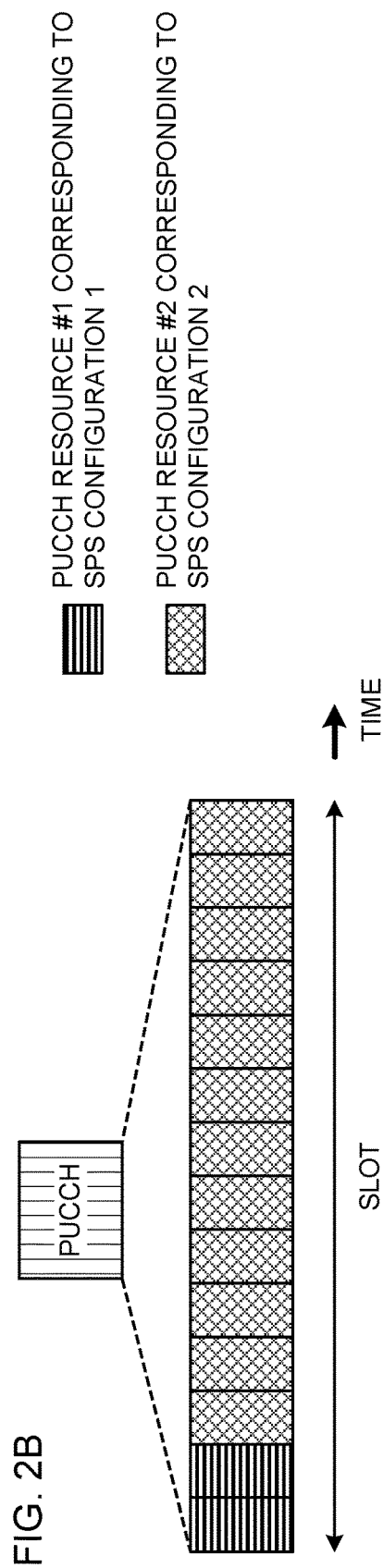

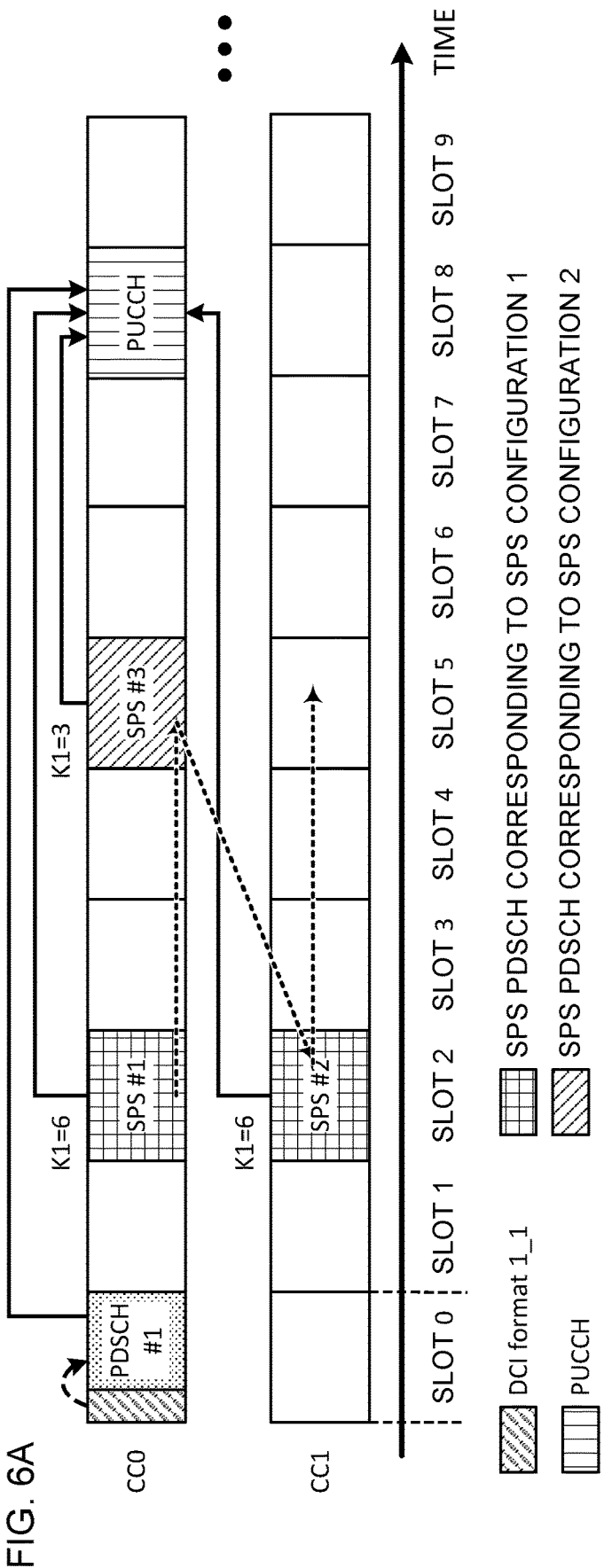

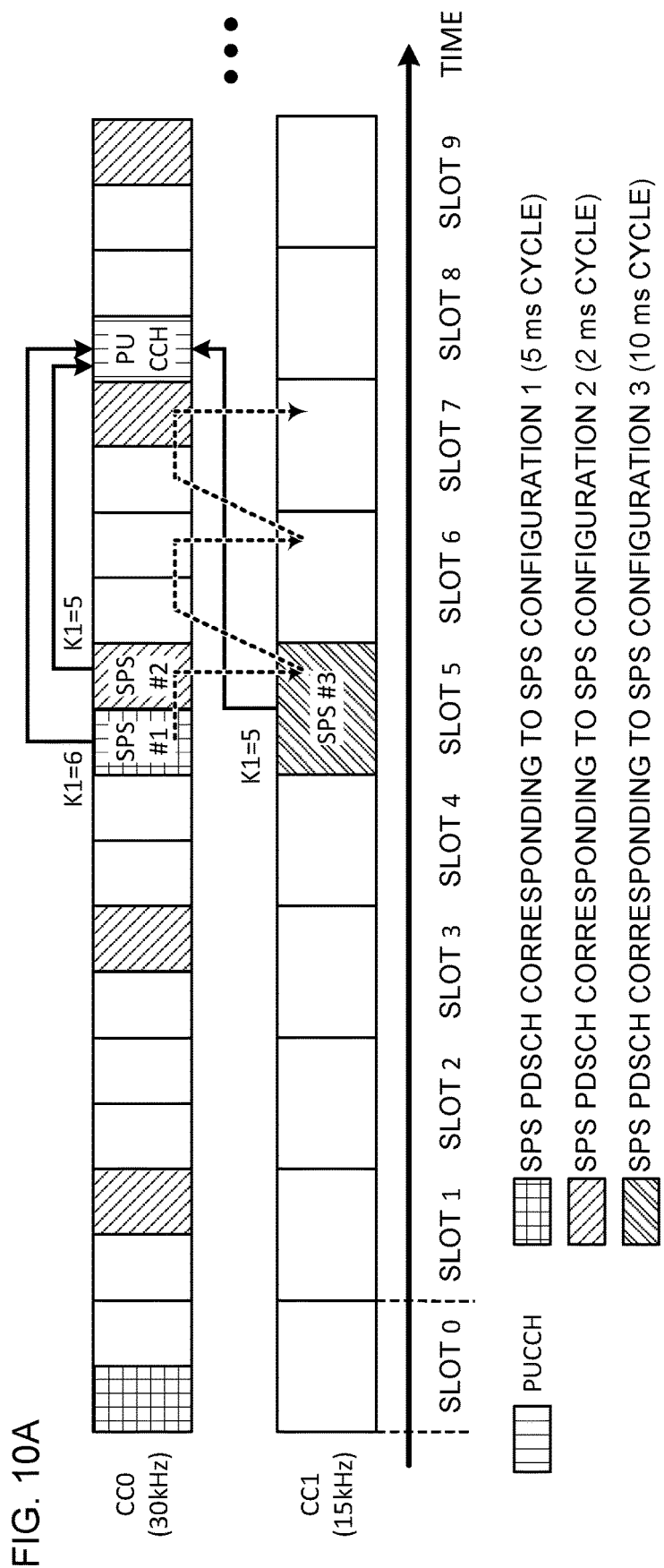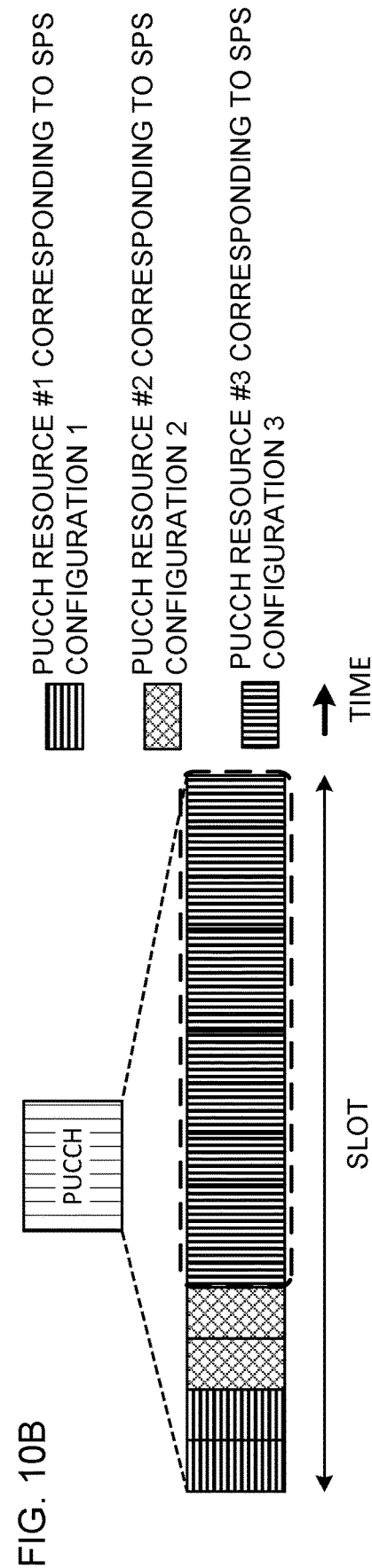

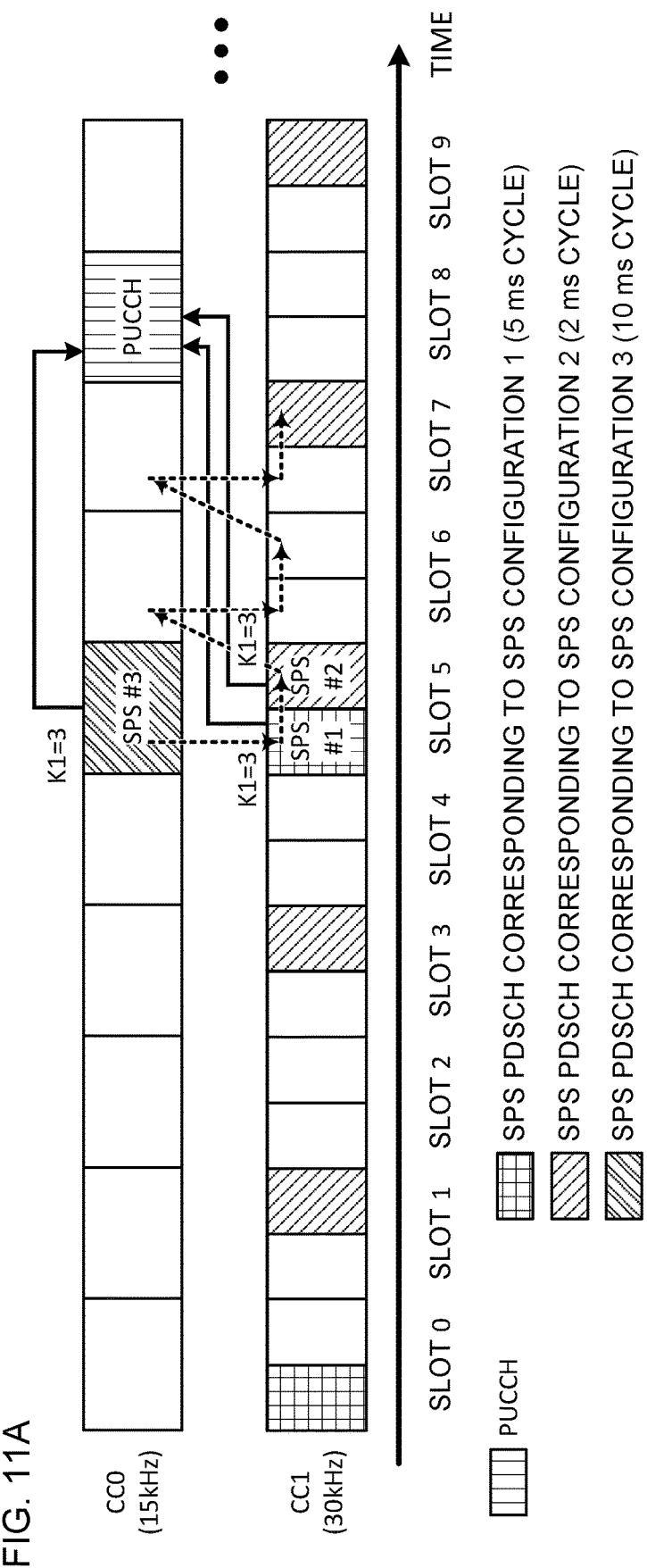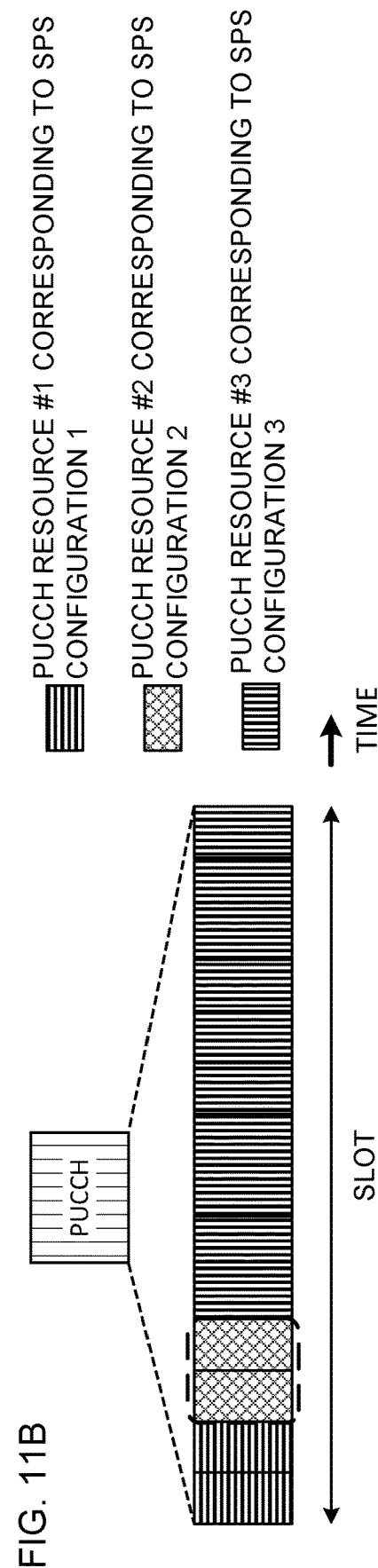
FIG. 11A
FIG. 11B

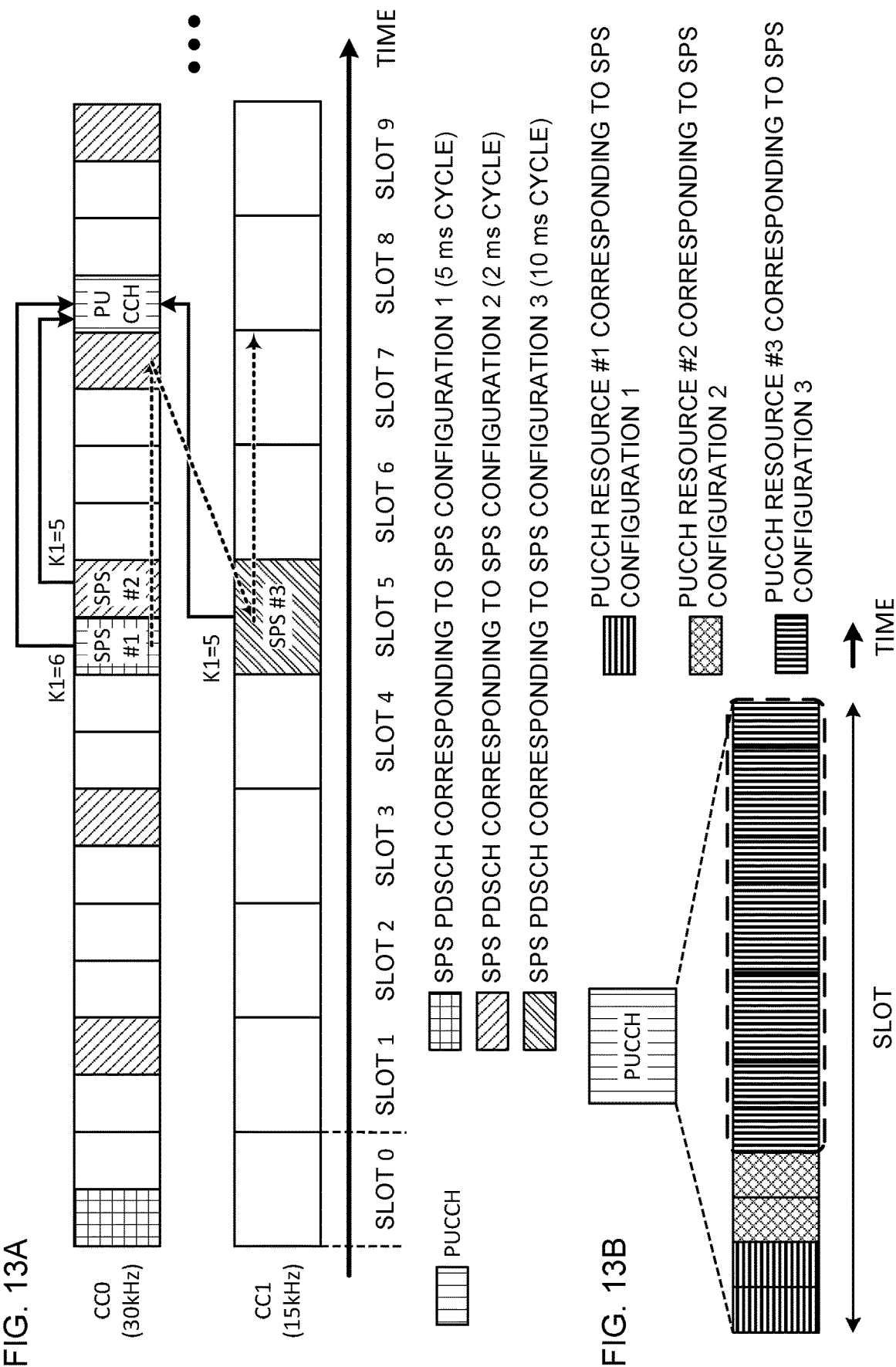

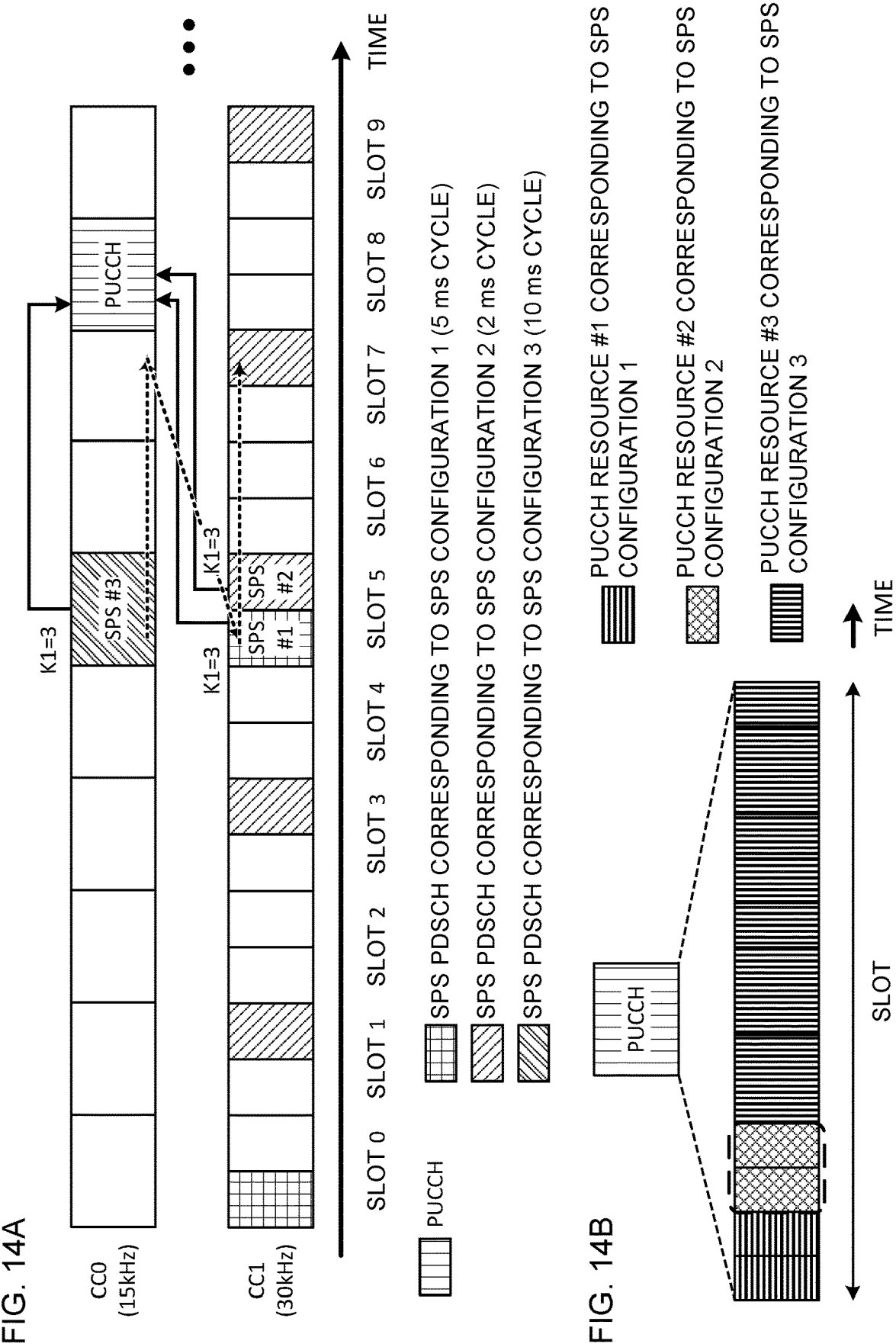

USER TERMINAL AND RADIO COMMUNICATION METHOD

TECHNICAL FIELD

The present disclosure relates to a user terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (e.g., NR), transmission and reception based on a semi-persistent scheduling (SPS) are utilized.

In existing Rel-15 NR specifications, the SPS is not simultaneously configured for more than one serving cell per cell group (in other words, one SPS configuration per cell group).

Incidentally, for Rel-16 (or later versions) NR, configuring a plurality of SPSs (multiple SPSs) in one cell group is under study for more flexible control. An SPS cycle of existing Rel-15 NR is 10 ms at the minimum, but introduction of an SPS cycle with a shorter cycle (e.g., a given number of symbol units, slot units, or the like) is also under study.

In this case, it is required that more than one piece of transmission confirmation information (e.g., Hybrid Automatic Repeat reQuest ACKnowledgement (HARQ-ACK)) for the plurality of SPSs is contained in one HARQ-ACK codebook. However, studies of a configuration of an HARQ-ACK codebook related to the plurality of SPSs, a determination of an uplink control channel (Physical Uplink Control Channel (PUCCH)) resource for transmission of the codebook, and the like have not advanced yet. Unless these are definitely defined, appropriate HARQ control is unavailable when the plurality of SPSs are utilized, and communication throughput may deteriorate, for example.

Thus, an object of the present disclosure is to provide a user terminal and a radio communication method that can feed back HARQ-ACK appropriately even when a plurality of SPSs are utilized.

Solution to Problem

A user terminal according to an aspect of the present disclosure includes a control section that generates a Hybrid Automatic Repeat reQuest ACKnowledgement (HARQ-ACK) codebook containing only HARQ-ACK corresponding to a semi-persistent scheduling (SPS) downlink shared channel (Physical Downlink Shared Channel (PDSCH)), so that HARQ-ACK bits corresponding to the PDSCH of each SPS PDSCHs are ordered in accordance with a given rule, and a transmitting section that transmits an HARQ-ACK information bit corresponding to the HARQ-ACK codebook by using an uplink control channel resource based on an SPS corresponding to HARQ-ACK at a specific location in the order.

Advantageous Effects of Invention

According to an aspect of the present disclosure, it is possible to feed back HARQ-ACK appropriately even when a plurality of SPSs are utilized.

BRIEF DESCRIPTION OF DRAWINGS

FIGS. 2A and 2B are diagrams to show another example of the technical challenge in the case where the plurality of SPSs are used;

FIGS. 6A and 6B are diagrams to show an example of an order of HARQ-ACK bits according to Embodiment 1-2;

FIGS. 10A and 10B are diagrams to show another example of the PUCCH resources according to Embodiment 2-1;

FIGS. 11A and 11B are diagrams to show still another example of the PUCCH resources according to Embodiment 2-1;

FIGS. 13A and 13B are diagrams to show another example of the PUCCH resources according to Embodiment 2-1;

FIGS. 14A and 14B are diagrams to show still another example of the PUCCH resources according to Embodiment 2-1;

DESCRIPTION OF EMBODIMENTS

Figure 1:
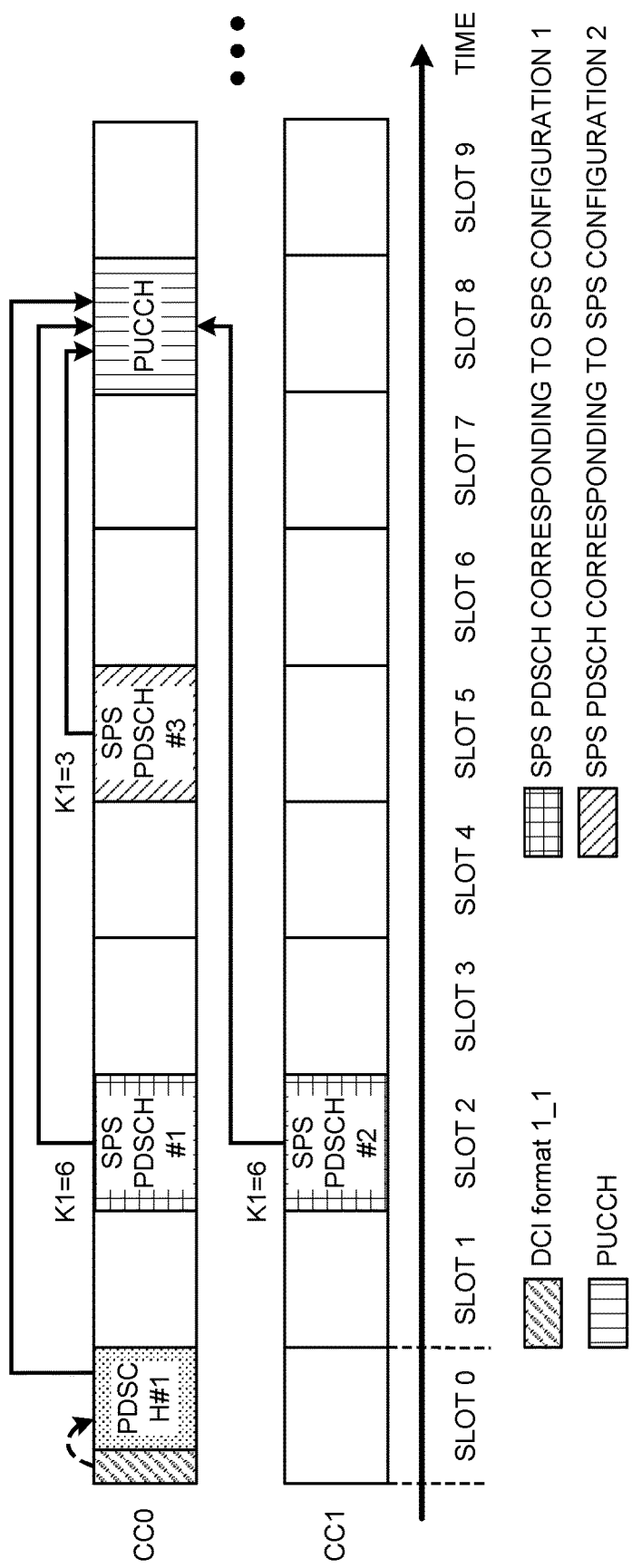
FIG. 1 is a diagram to show an example of a technical challenge in a case where a plurality of SPSs are used.

In NR, transmission and reception based on a semi-persistent scheduling (SPS) are utilized. In the present disclosure, the SPS and a downlink (DL) SPS may be interchangeably interpreted.

A UE may activate or deactivate (release) an SPS configuration on the basis of a downlink control channel (Physical Downlink Control Channel (PDCCH)). The UE may perform, on the basis of the activated SPS configuration, reception of a downlink shared channel (Physical Downlink Shared Channel (PDSCH)) with a corresponding SPS.

Note that in the present disclosure, the PDCCH may be interpreted as downlink control information (DCI) transmitted using a PDCCH, or may be simply interpreted as DCI and so on.

DCI to activate or deactivate the SPS configuration may be referred to as SPS activation DCI, SPS deactivation DCI, and so on. The SPS deactivation DCI may be referred to as SPS release DCI, or may be simply referred to as SPS release and so on.

The DCI may have cyclic redundancy check (CRC) bits scrambled with a given RNTI (e.g., a configured scheduling radio network temporary identifier (CS-RNTI)).

The UE may activate or release the SPS configuration on the basis of DCI (SPS activation DCI or SPS release DCI).

The SPS configuration (which may be referred to as configuration information related to the SPS) may be configured for the UE by using higher layer signaling.

In the present disclosure, the higher layer signaling may be, for example, any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The configuration information related to the SPS (e.g., "SPS-Config" information element for RRC) may include an index (SPS index) for identification of the SPS, information (e.g., an SPS cycle) related to an SPS resource, information related to a PUCCH resource for the SPS, and the like. Note that the information related to the PUCCH resource for the SPS may correspond to, for example, an RRC parameter "n1PUCCH-AN," and this parameter may indicate a PUCCH resource ID.

The SPS may be configured for a special cell (SpCell) (e.g., a primary cell (PCell) or a primary secondary cell (PSCell)), or may be configured for a secondary cell (SCell). Note, however, that, in existing Rel-15 NR specifications, the SPS is not simultaneously configured for more than one serving cell per cell group (in other words, one SPS configuration per cell group).

(HARQ-ACK Codebook)

The UE may transmit, by using one PUCCH resource, Hybrid Automatic Repeat reQuest ACKnowledgement (HARQ-ACK) feedback in an HARQ-ACK codebook unit constituted by a bit(s) of one or more pieces of transmission confirmation information (e.g., HARQ-ACK). The HARQ-ACK bits may be referred to as HARQ-ACK information, HARQ-ACK information bits, and so on.

Here, the HARQ-ACK codebook may contain a bit for HARQ-ACK in at least one unit of a time domain (e.g., a slot), a frequency domain (e.g., a component carrier (CC)), a spatial domain (e.g., a layer), a transport block (TB), and a code block group (CBG) that constitutes a TB. The HARQ-ACK codebook may be simply referred to as a codebook.

Note that the number (size) of bits contained in the HARQ-ACK codebook and the like may be determined semi-statically or dynamically. The HARQ-ACK codebook with a size is determined semi-statically may be referred to as a semi-static HARQ-ACK codebook, a Type-1 HARQ-ACK codebook, and so on. The HARQ-ACK codebook with a size determined dynamically may be referred to as a dynamic HARQ-ACK codebook, a Type-2 HARQ-ACK codebook, and so on.

Which of the Type-1 HARQ-ACK codebook and the Type-2 HARQ-ACK codebook is used may be configured for the UE by using a higher layer parameter (e.g., pdsch-HARQ-ACK-Codebook).

In a case of the Type-1 HARQ-ACK codebook, the UE may feed back, in a given range (e.g., a range configured on the basis of the higher layer parameter), the HARQ-ACK bits for a PDSCH candidate (or a PDSCH occasion) corresponding to the given range regardless of the presence or absence of PDSCH scheduling.

The given range may be determined on the basis of at least one of a given period (e.g., a set of a given number of occasions for reception of a PDSCH candidate or a given number of monitoring occasions for a PDCCH), the number of CCs configured or activated for the UE, the number of TBs (the number of layers or rank), the number of CBGs per TB, and the presence or absence of application of spatial bundling. The given range may be referred to as an HARQ-ACK window, an HARQ-ACK bundling window, an HARQ-ACK feedback window, and so on.

In the case of the Type-1 HARQ-ACK codebook, within the given range, even when there is no PDSCH scheduling for the UE, the UE reserves a bit for the PDSCH in the codebook. When the UE judges that the PDSCH is in fact not scheduled, the UE can feed back the bit as a NACK bit.

On the other hand, in a case of the Type-2 HARQ-ACK codebook, the UE may feed back, in the above-described given range, the HARQ-ACK bits for a scheduled PDSCH.

Specifically, the UE may determine the number of bits of the Type-2 HARQ-ACK codebook on the basis of a given field (e.g., a DL assignment index (Downlink Assignment Indicator (Index) (DAI)) field) in DCI. The DAI field may include a counter DAI (C-DAI) and total DAI (T-DAI).

The C-DAI may indicate a counter value for downlink transmission (PDSCH, data, or TB) scheduled within a given period. For example, the C-DAI in DCI to schedule data within the given period may indicate the number of counts obtained by counting firstly in a frequency domain (e.g., a CC) and secondly in a time domain within the given period. For example, the C-DAI may correspond to a value obtained by counting PDSCH reception or SPS release firstly in ascending order of serving cell indices and secondly in ascending order of PDCCH monitoring occasions with respect to one or more pieces of DCI included in a given period.

The T-DAI may indicate the sum (total number) of data scheduled within the given period. For example, the T-DAI in DCI to schedule data in a given time unit (e.g., PDCCH monitoring occasions) within the given period may indicate the total number of data scheduled within the given period until the time unit (referred to as a point, a timing, and so on).

(SPS and HARQ-ACK Codebook)

In existing Rel-15 NR, an order of the HARQ-ACK bits in the codebook is determined as described below. With respect to the Type-1 HARQ-ACK codebook, the UE arranges the HARQ-ACK bits corresponding to an SPS PDSCH and SPS release in the HARQ-ACK codebook similarly to the HARQ-ACK bits corresponding to a dynamic PDSCH (e.g., in accordance with a list (table) related to time domain resource assignment). There is no difference between handling of the SPS PDSCH, SPS release, and dynamic PDSCH corresponding to a PDSCH reception occasion within the given period.

Note that the dynamic PDSCH may mean a PDSCH scheduled using DCI (e.g., DCI format 1_0, 1_1, or the like) dynamically.

In the existing Rel-15 NR, with respect to the Type-2 HARQ-ACK codebook, the UE may arrange the HARQ-ACK bits corresponding to the SPS PDSCH after the HARQ-ACK codebook corresponding to a dynamic TB-based PDSCH.

Moreover, in the existing Rel-15 NR, the UE does not expect that the HARQ-ACK information for reception of more than one SPS PDSCH is transmitted on the same PUCCH.

Note that in the existing Rel-15 NR, the HARQ-ACK bits corresponding to the SPS PDSCH may be arranged after the HARQ-ACK codebook corresponding to the dynamic TB-based PDSCH.

In the existing Rel-15 NR, when the UE transmits the HARQ-ACK bits corresponding to only PDSCH reception without a corresponding PDCCH, a PUCCH resource for PUCCH transmission corresponding to the HARQ-ACK information may be identified by an RRC parameter "n1PUCCH-AN."

Incidentally, for Rel-16 (or later versions) NR, configuring a plurality of SPSs (multiple SPSs) in one cell group is under study for more flexible control. The UE may utilize a plurality of SPS configurations for one or a plurality of serving cells. An SPS cycle of existing Rel-15 NR is 10 ms at the minimum, but introduction of an SPS cycle with a shorter cycle (e.g., a given number of symbol units, slot units, or the like) is also under study.

In this case, it may be required that more than one HARQ-ACK information for the plurality of SPSs is contained in one HARQ-ACK codebook. However, studies of how to configure the HARQ-ACK codebook related to the plurality of SPSs have not advanced yet. Unless the HARQ-ACK codebook related to the plurality of SPSs is definitely defined, appropriate HARQ control is unavailable when the plurality of SPSs are utilized, and communication throughput may deteriorate and the like.

FIG. 1 is a diagram to show an example of a technical challenge in a case where the plurality of SPSs are used.

In the present assumption, the UE has a plurality of SPS configurations (SPS configurations 1 and 2) with respect to two serving cells (CCs 0 and 1). SPS configuration 1 of FIG. 1 relates to SPS PDSCH reception at a first SPS cycle, and in this regard, FIG. 1 shows SPS PDSCHs for CCs 0 and 1 (SPS PDSCHs #1 and #2, respectively) in slot 2. In this manner, the SPS PDSCH reception with respect to a plurality of CCs may be scheduled by one SPS configuration.

Note that each CC of FIG. 1 may be assumed to have sub-carrier spacing (SCS)=15 kHz (in other words, a slot length=1 ms). In the other drawings of the present disclosure, it may be assumed that SCS for a CC that is not particularly described=15 kHz. Note that in respective drawings of the present disclosure, slots 0 to 9 may each indicate a slot number of a CC corresponding to SCS=15 kHz.

SPS configuration 2 of FIG. 1 relates to SPS PDSCH reception at a second SPS cycle (which may be the same as the first SPS cycle, or may be different from the first SPS cycle), and in this regard, FIG. 1 shows an SPS PDSCH for CC 0 (SPS PDSCH #3) in slot 5. In the present disclosure, the SPS PDSCH may be simply described as SPS.

SPS configurations 1 and 2 have already (before illustrated slot 0) been activated by DCI. In other words, SPSs #1 to #3 of FIG. 1 correspond to an SPS PDSCH not related to activation DCI.

A timing of HARQ-ACK transmission (which may be referred to as a PDSCH-to-HARQ feedback timing, K1, and so on) for the SPS PDSCH not related to the activation DCI may be identified by a PDSCH-to-HARQ feedback timing indicator field included in the activation DCI that has activated the SPS.

The PDSCH-to-HARQ feedback timing corresponds to a timing indicator field for HARQ corresponding to a PDSCH. Letting the last slot in which a PDSCH has been received be n, the UE may transmit HARQ-ACK corresponding to the PDSCH in slot n+K1. Note that the PDSCH-to-HARQ feedback timing may be referred to as a PDSCH-to-HARQ-ACK feedback timing.

For example, PDSCH-to-HARQ feedback timing indicator values 0 to 7 included in DCI format 1_0 may correspond to K1=1 to 8 [slot], respectively.

A value indicating the number of slots configured by higher layer signaling (an RRC parameter "dl-DataToUL-ACK") may be determined for each of PDSCH-to-HARQ feedback timing indicator values 0 to 7 included in DCI format 1_1.

Note that designation of the above-described PDSCH-to-HARQ feedback timing is not limited to a slot unit, and may be performed, for example, in a mini-slot unit. Inclusion of more than one HARQ-ACK information for the plurality of SPSs in one HARQ-ACK codebook may also be performed in the mini-slot unit.

In FIG. 1, it is assumed that K1=6 with respect to SPSs #1 and #3 and K1=3 with respect to SPS #2 are designated.

In the present disclosure, all of SPS PDSCHs is retransmitted a TB basis for simplicity, but may be retransmitted on a CBG basis. For example, an SPS PDSCH in a TB-based cell (in other words, a cell in which TB-based retransmission is configured) may be retransmitted on a TB basis. An SPS PDSCH in a CBG-based cell (in other words, a cell in which CBG-based retransmission is configured) may be retransmitted on a CBG basis. The maximum number of TBs of each CC may be, for example, 1.

In slot 0 of CC 0, the UE receives DCI format 1_1 to receive PDSCH #1 on the basis of the DCI. The DCI may indicate that K1=8. For example, this DCI may include (C-DAI, T-DAI)=(1, 1). Each DAI value, corresponding K1 value, and the like are not limited to these.

Note that PDSCH #1 may be interpreted as a PDSCH scheduled by DCI format 1_0. This DCI may include (C-DAI)=(1). DCI format 1_1 in FIG. 1 may be interpreted as DL DCI and UL grant, or may be simply interpreted as DCI and so on. DCI format 1_1 in later drawings may also be interpreted likewise.

The UE receives SPS #1 in slot 2 of CC 0, receives SPS #2 in slot 2 of CC 1, and receives SPS #3 in slot 5 of CC 0. In FIG. 1, the UE transmits all of HARQ-ACKs for PDSCH #1 and SPSs #1 to #3 by using a PUCCH resource in slot 8 of CC 0.

However, studies of how to arrange a bit order of HARQ-ACK for the SPS in the HARQ-ACK codebook in a case where a plurality of SPS configurations are active, such as a case of FIG. 1, and HARQ-ACKs for respective SPS configurations are transmitted on the same PUCCH have not advanced yet.

FIGS. 2A and 2B are diagrams to show another example of the technical challenge in the case where the plurality of SPSs are used.

FIG. 2A is an example similar to FIG. 1, but differs from FIG. 1 with regard to PDSCH #1 that is not scheduled in slot 0 of CC 0. In other words, the HARQ-ACK codebook for a PUCCH of FIG. 2A contains only HARQ-ACKs for the SPSs. For this case, deriving a resource for the PUCCH from reception of a specific (e.g., the first or last) SPS PDSCH related to the HARQ-ACK codebook is under study.

FIG. 2B is a diagram to show an example of the PUCCH resource that can be used as the PUCCH of FIG. 2A. PUCCH resources #1 and #2 correspond to, for example, RRC parameters "n1PUCCH-AN" for SPS configurations 1 and 2, respectively. In the present example, a time resource of PUCCH resource #1 is symbols #0 and #1 in a slot, and a time resource of PUCCH resource #2 is symbols #2 to #13 in the slot, but PUCCH resources to be configured are not limited to these. For example, PUCCH resources corresponding to SPS configurations may overlap with each other in at least one of a time domain and frequency domain.

However, it is required that this specific SPS PDSCH reception be defined more specifically. This is because, for example, "the first SPS PDSCH reception" is not definite about what "the first" means. Accordingly, in the case of FIG. 2A, the UE cannot determine which of PUCCH resources of FIG. 2B is used.

As described above, studies of a configuration of the HARQ-ACK codebook related to the plurality of SPSs, a determination of the PUCCH resource for transmission of the codebook, and the like have not advanced yet. Unless these are definitely defined, appropriate HARQ control is unavailable when the plurality of SPSs are utilized, and communication throughput may deteriorate, for example.

Thus, the inventors of the present invention came up with the idea of a method for feeding back HARQ-ACK appropriately even when the plurality of SPSs are utilized.

Embodiments according to the present disclosure will be described in detail hereinafter with reference to the drawings. The radio communication methods according to respective embodiments may each be employed individually, or may be employed in combination.

In the present disclosure, the codebook is assumed to be the Type-2 HARQ-ACK codebook, but may be interpreted as the Type-1 HARQ-ACK codebook.

Note that in the present disclosure, the SPS PDSCH related to activation DCI may mean the first SPS PDSCH activated (triggered) by the activation DCI. The SPS PDSCH related to the activation DCI may be referred to as an SPS PDSCH having related DCI, an SPS PDSCH with a corresponding PDCCH, an SPS PDSCH indicated by DCI, and so on.

At least one of a frequency resource, a time resource, and a modulation and coding scheme (MCS) for the SPS PDSCH related to the activation DCI may be determined on the basis of at least one of a frequency resource assignment field, a time resource assignment field, and an MCS index for the activation DCI.

In the present disclosure, the SPS PDSCH not related to activation DCI may mean the second or later SPS PDSCH activated by the activation DCI. The SPS PDSCH not related to the activation DCI may be referred to as an SPS PDSCH without related DCI, an SPS PDSCH without a corresponding PDCCH, and so on.

In the present disclosure, the SPS PDSCH may be interchangeably interpreted as SPS PDSCH reception. A normal PDSCH (dynamic PDSCH) that is not the SPS PDSCH is described as a TB-based PDSCH, but the present disclosure is not limited to this.

In the present disclosure, an example in which the UE transmits a PUCCH in CC 0 is illustrated, but the PUCCH may be transmitted in another CC such as CC 1. The CC to transmit the PUCCH may be designated (configured) on the basis of DCI (e.g., activation DCI), RRC signaling, and the like, or may be determined on the basis of the SPS PDSCH or SPS configuration for determination of the PUCCH resource.

Radio Communication Method

First Embodiment

A first embodiment relates to an order of HARQ-ACKs for SPSs in one HARQ-ACK codebook.

In the first embodiment, an order of bits for SPS PDSCHs related to an HARQ-ACK codebook transmitted on the same PUCCH may be determined by applying the following rules (1) to (3) in an arbitrary sequence:
(1) Earlier SPS occasion first (ordered by earliest SPS occasion),
(2) Lower CC (in other words, carrier with lower CC index) first (ordered by smallest CC), and
(3) Lower SPS index first (ordered by smallest SPS index).

Note that "earlier" in these rules may be interpreted as "later," and "lower" in these rules may be interpreted as "higher." The SPS index may be interchangeably interpreted as an SPS configuration index and so on.

The first embodiment will be described in greater detail by using embodiments below.

Embodiment 1-1

In Embodiment 1-1, HARQ-ACK bits for reception of an SPS PDSCH without related DCI may be arranged firstly in ascending order of serving cell indices, and secondary in descending order of PDSCH-to-HARQ feedback timing values (the above-described (2)->(1)).

Figure 3A:
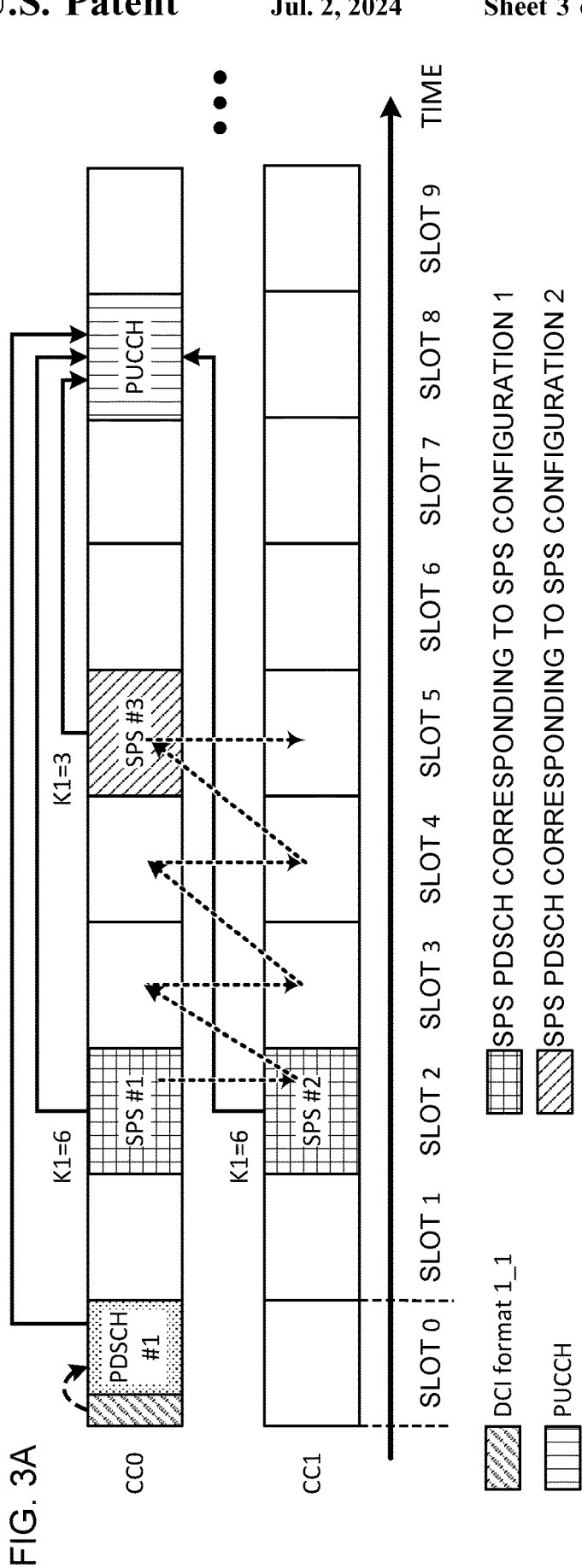
FIGS. 3A and 3B are diagrams to show an example of an order of HARQ-ACK bits according to Embodiment 1-1.
Figure 3B:
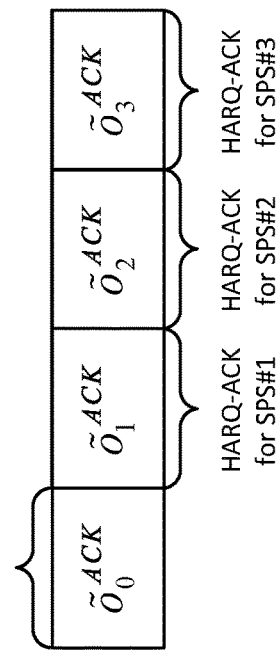

FIGS. 3A and 3B are diagrams to show an example of an order of the HARQ-ACK bits according to Embodiment 1-1. FIG. 3A is an example similar to FIG. 1, but differs from FIG. 1 with regard to the order of the HARQ-ACK bits for the SPS PDSCH that is shown by dotted line arrows. Note that dotted line arrows of the present disclosure are illustrated by extracting only a section for descriptions, and thus may in fact be much longer (may be, for example, arrows that scan from a section corresponding to K1=8 to a section corresponding to K1=1 in the present example).

FIG. 3B is a diagram to show contents of each bit for the HARQ-ACK codebook corresponding to FIG. 3A. FIG. 3B shows 4 bits in total of $o_0^{ACK}$ through $o_3^{ACK}$. Note that in the present description, the tilde (~) added above "o" of $o_k^{ACK}$ (k is an integer) is omitted for simplicity, but this is interchangeably interpreted as a notation with the tilde as shown in the drawings. Note that $o_k^{ACK}$ may mean HARQ-ACK for a PDSCH with C-DAI=k+1 in a TB-based codebook.

The UE may arrange HARQ-ACK bits (if any) corresponding to a normal PDSCH (PDSCH #1 in FIG. 3B) at the first of the HARQ-ACK codebook in sequence from the highest K1 (e.g., K1=8) to the lowest K1 (e.g., K1=1) in a similar manner to Rel-15.

HARQ-ACK bits corresponding to an SPS PDSCH not related to activation DCI may be arranged at a tail end part of HARQ-ACK bits for a TB-based PDSCH. HARQ-ACK bits corresponding to an SPS may be arranged in sequence, an earlier (lower) CC index and an earlier (lower) SPS occasion.

In a case of FIG. 3B, $o_0^{ACK}$ to $o_3^{ACK}$ correspond to the following:
  $o_0^{ACK}$: PDSCH #1,
  $o_1^{ACK}$: SPS #1,
  $o_2^{ACK}$: SPS #2,
  $o_3^{ACK}$: SPS #3.

Figure 4A:
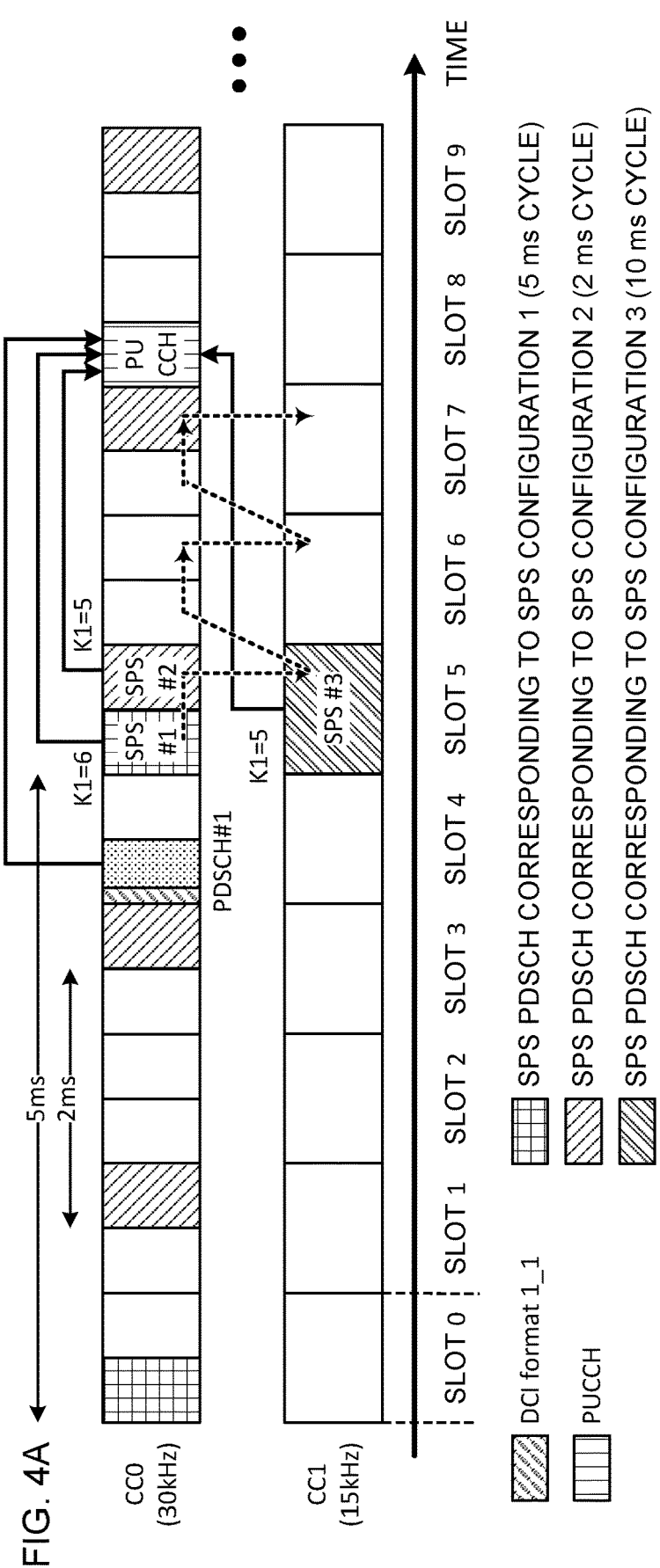
FIGS. 4A and 4B are diagrams to show another example of the order of the HARQ-ACK bits according to Embodiment 1-1.
Figure 4B:
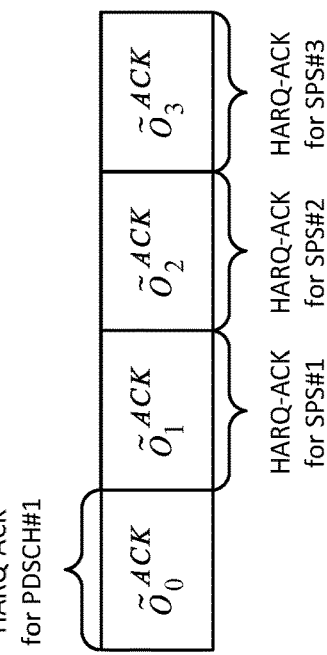

FIGS. 4A and 4B are diagrams to show another example of the order of the HARQ-ACK bits according to Embodiment 1-1. In FIG. 4A, three SPS configurations in total of two SPS configurations (SPS configurations 1 and 2) with respect to CC 0 and one SPS configuration (SPS configuration 3) with respect to CC 1 are configured for the UE. SPS configurations 1, 2, and 3 correspond to SPS cycles=5, 2, and 10 ms, respectively.

The UE assumes that each illustrated SPS PDSCH can be received, but only SPSs #1 to #3 shown in FIG. 4A have in fact been transmitted. In other words, the UE assumes that transmission has not been performed in an SPS resource (timing) having no character (the UE has not received this SPS PDSCH). In later examples, it may also be assumed that an SPS has not been transmitted in the SPS resource having no character.

The present disclosure describes a case where the UE generates HARQ-ACK with respect to an SPS PDSCH that has been received within a period corresponding to a PUCCH and does not generate HARQ-ACK with respect to an SPS PDSCH that has not been received, but the UE can generate the HARQ-ACK codebook appropriately on the basis of descriptions of the present disclosure even when the latter HARQ-ACK is generated.

FIG. 4A corresponds to a case where SCS (which may be referred to as UL SCS) for a CC (CC 0) to transmit the PUCCH is greater than SCS (which may be referred to as DL SCS) for another CC (CC 1) in which an SPS is configured. In other words, FIG. 4A corresponds to a case where numerologies are different from each other between CCs. In FIG. 4A, SCS for CC 0 is 30 kHz, and SCS for CC 1 is 15 kHz. Note that it can be said that above-mentioned FIG. 3A corresponds to a case where these pieces of SCS are the same.

K1 shown in FIG. 4A may correspond to a value based on a slot of CC 0 to transmit the PUCCH. SPS #1 corresponds to K1=6, and SPS #2 corresponds to K1=5. The end of a slot for SPS #3 overlaps with a slot for SPS #2, and thus SPS #3 corresponds to K1=5. Note that K1 may be converted from a value (e.g., K1=3 with respect to SPS #3 of FIG. 4A) based on a slot of each CC to receive the SPS PDSCH, to the above-described value.

According to a rule of Embodiment 1-1, the order of the HARQ-ACK bits for the SPS PDSCH of FIG. 4A is as shown by dotted line arrows.

FIG. 4B is a diagram to show contents of each bit for the HARQ-ACK codebook corresponding to FIG. 4A. In a case of FIG. 4B, $o_0^{ACK}$ to $o_3^{ACK}$ correspond to the following:
  $o_0^{ACK}$: PDSCH #1,
  $o_1^{ACK}$: SPS #1,
  $o_2^{ACK}$: SPS #2,
  $o_3^{ACK}$: SPS #3.

Figure 5A:
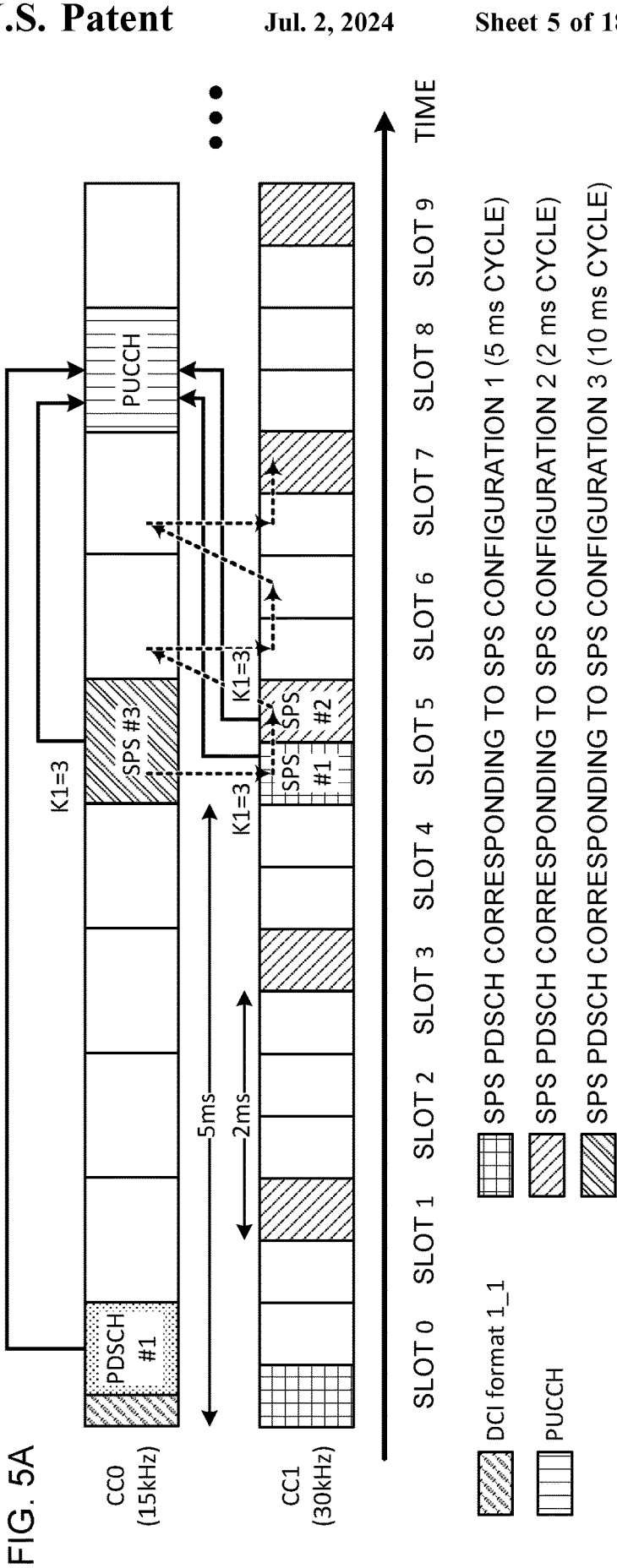
FIGS. 5A and 5B are diagrams to show still another example of the order of the HARQ-ACK bits according to Embodiment 1-1.
Figure 5B:
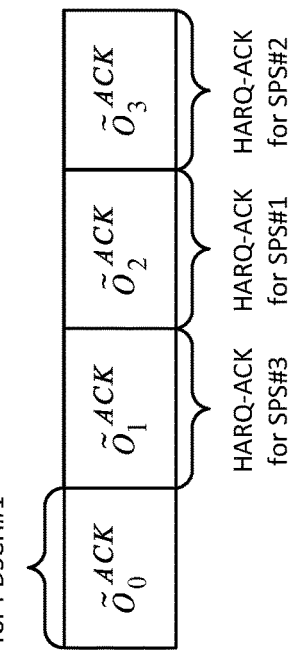

FIGS. 5A and 5B are diagrams to show still another example of the order of the HARQ-ACK bits according to Embodiment 1-1. In FIG. 5A, three SPS configurations in total of one SPS configuration (SPS configuration 3) with respect to CC 0 and two SPS configurations (SPS configurations 1 and 2) with respect to CC 1 are configured for the UE. SPS configurations 1, 2, and 3 correspond to SPS cycles=5, 2, and 10 ms, respectively.

FIG. 5A corresponds to a case where SCS for a CC (CC 0) to transmit the PUCCH is less than SCS for another CC (CC 1) in which an SPS is configured. In other words, FIG. 5A corresponds to another case where numerologies are different from each other between CCs. In FIG. 5A, SCS for CC 0 is 15 kHz, and SCS for CC 1 is 30 kHz.

K1 shown in FIG. 5A may correspond to a value based on a slot of CC 0 to transmit the PUCCH. SPS #3 corresponds to K1=3. The ends of slots for SPS #1 and #2 overlap with a slot for SPS #3, and thus both SPS #1 and #2 correspond to K1=3.

According to a rule of Embodiment 1-1, the order of the HARQ-ACK bits for the SPS PDSCH of FIG. 4A is as shown by dotted line arrows. Note that in FIG. 5A, when there are a plurality of SPSs with the same PDSCH-to-HARQ feedback timing value in a certain CC, a rule that requires a sequence of these HARQ-ACKs in ascending order of SPS indices is introduced (in consideration of the above-described (3)).

FIG. 5B is a diagram to show contents of each bit for the HARQ-ACK codebook corresponding to FIG. 5A. In a case of FIG. 5B, $o_0^{ACK}$ to $o_3^{ACK}$ correspond to the following:
  $o_0^{ACK}$: PDSCH #1,
  $o_1^{ACK}$: SPS #1,
  $o_2^{ACK}$: SPS #2,
  $o_3^{ACK}$: SPS #3.

Embodiment 1-2

In Embodiment 1-2, HARQ-ACK bits for reception of an SPS PDSCH without related DCI may be firstly arranged in descending order of PDSCH-to-HARQ feedback timing values, and secondary in ascending order of serving cell indices (the above-described (1)->(2)).

FIGS. 6A and 6B are diagrams to show an example of an order of the HARQ-ACK bits according to Embodiment 1-2. FIG. 6A is an example similar to FIG. 3A, but differs from FIG. 3A in how to draw dotted line arrows related to the order of the HARQ-ACK bits for the SPS PDSCH.

FIG. 6B is a diagram to show contents of each bit for the HARQ-ACK codebook corresponding to FIG. 6A. In a case of FIG. 6B, $o_0^{ACK}$ to $o_3^{ACK}$ correspond to the following:
  $o_0^{ACK}$: PDSCH #1,
  $o_1^{ACK}$: SPS #1,
  $o_2^{ACK}$: SPS #2,
  $o_3^{ACK}$: SPS #3.

Figure 7A:
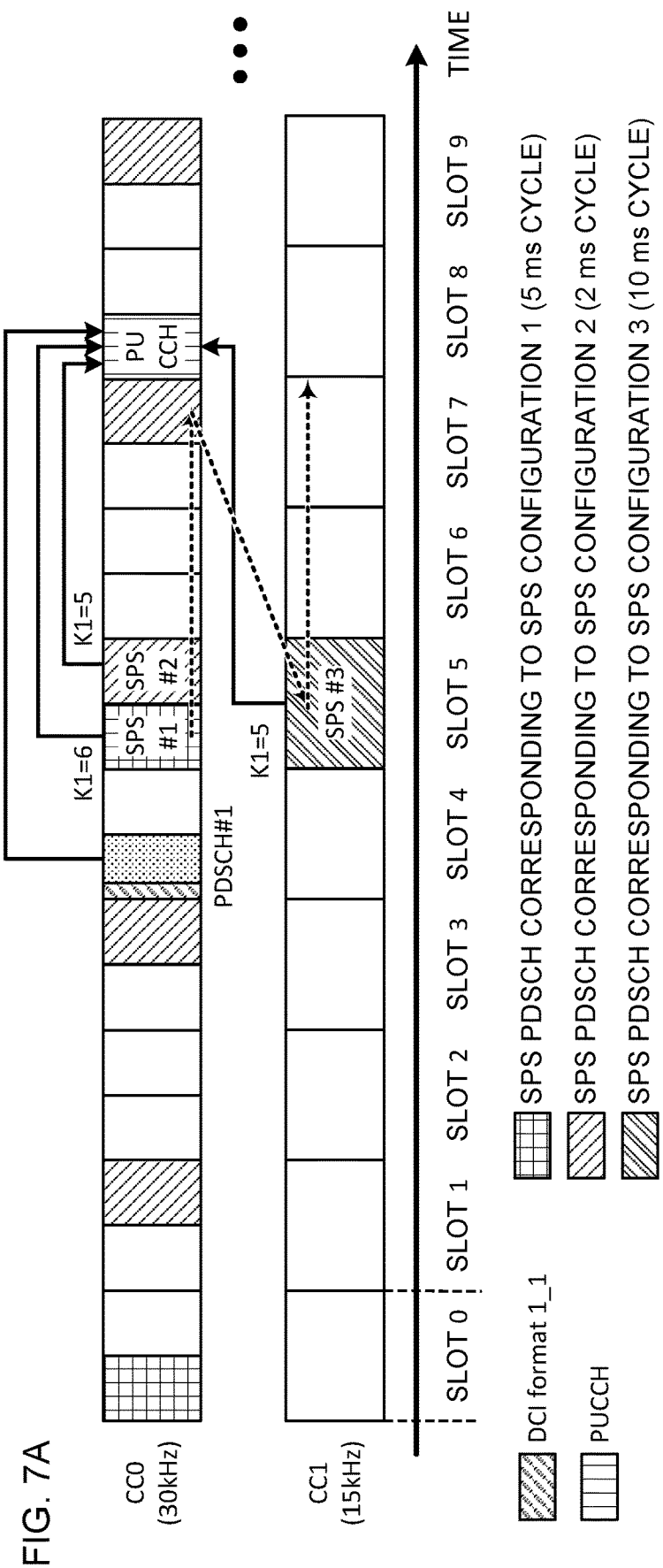
FIGS. 7A and 7B are diagrams to show another example of the order of the HARQ-ACK bits according to Embodiment 1-2.
Figure 7B:
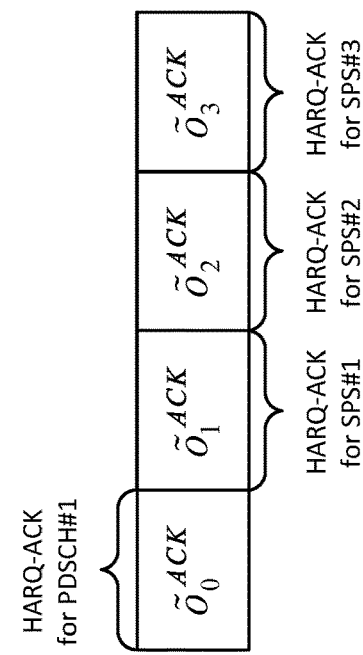

FIGS. 7A and 7B are diagrams to show another example of the order of the HARQ-ACK bits according to Embodiment 1-2. FIG. 7A is an example similar to FIG. 4A, but differs from FIG. 4A in how to draw dotted line arrows related to the order of the HARQ-ACK bits for the SPS PDSCH.

FIG. 7B is a diagram to show contents of each bit for the HARQ-ACK codebook corresponding to FIG. 7A. In a case of FIG. 7B, $o_0^{ACK}$ to $o_3^{ACK}$ correspond to the following:
- $o_0^{ACK}$: PDSCH #1,
- $o_1^{ACK}$: SPS #1,
- $o_2^{ACK}$: SPS #2,
- $o_3^{ACK}$: SPS #3.

Figure 8A:
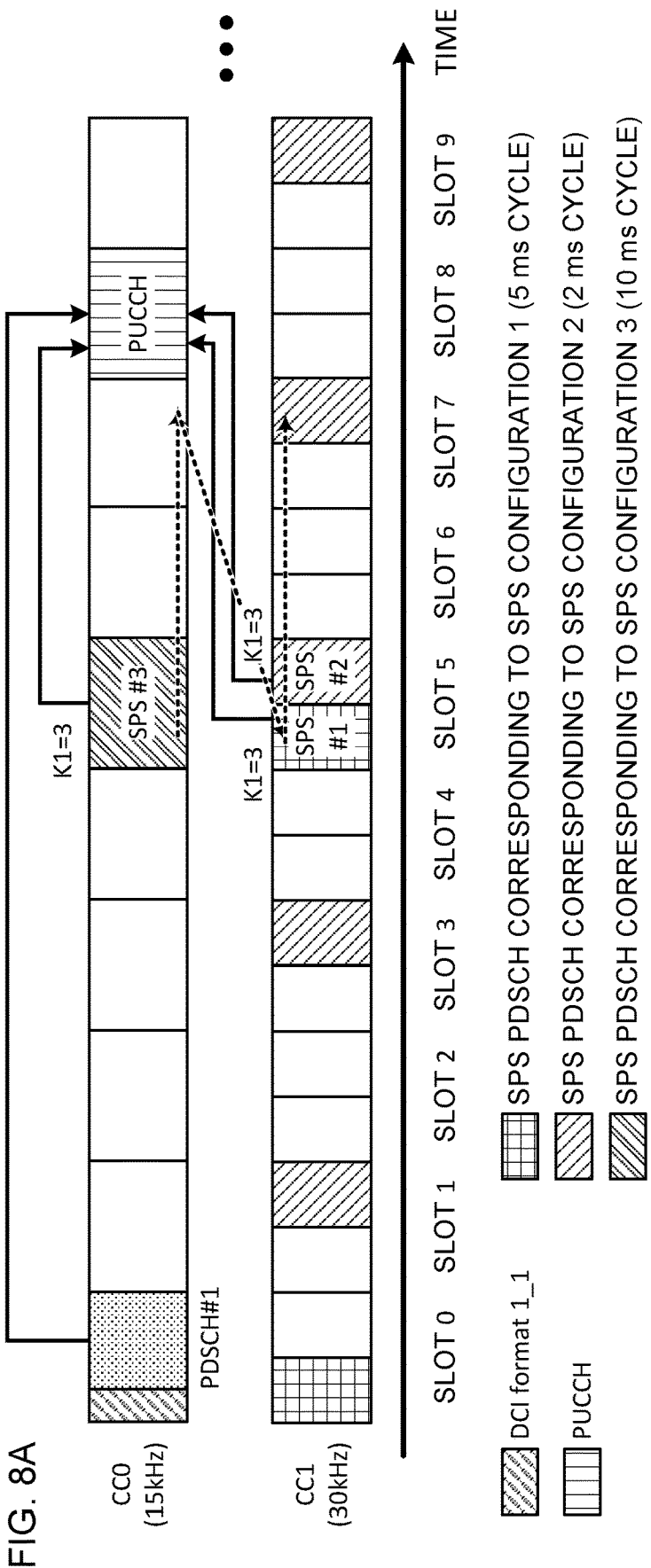
FIGS. 8A and 8B are diagrams to show still another example of the order of the HARQ-ACK bits according to Embodiment 1-2.
Figure 8B:
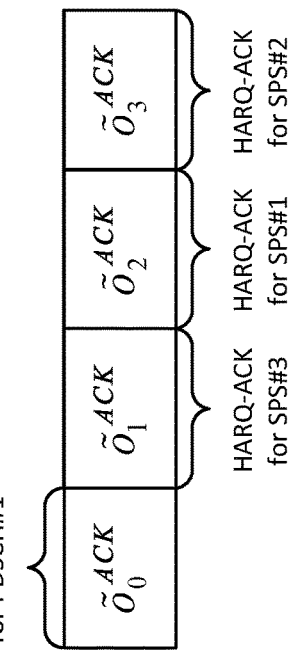

FIGS. 8A and 8B are diagrams to show still another example of the order of the HARQ-ACK bits according to Embodiment 1-2. FIG. 8A is an example similar to FIG. 5A, but differs from FIG. 5A in how to draw dotted line arrows related to the order of the HARQ-ACK bits for the SPS PDSCH.

According to a rule of Embodiment 1-2, the order of the HARQ-ACK bits for the SPS PDSCH of FIG. 8A is as shown by dotted line arrows. Note that in FIG. 5A, when there are a plurality of SPSs with the same PDSCH-to-HARQ feedback timing value in a certain CC, a rule that requires a sequence of these HARQ-ACKs in ascending order of SPS indices is introduced (in consideration of the above-described (3)).

FIG. 8B is a diagram to show contents of each bit for the HARQ-ACK codebook corresponding to FIG. 8A. In a case of FIG. 8B, $o_0^{ACK}$ to $o_3^{ACK}$ correspond to the following:
- $o_0^{ACK}$: PDSCH #1,
- $o_1^{ACK}$: SPS #3,
- $o_2^{ACK}$: SPS #1,
- $o_3^{ACK}$: SPS #2.

Embodiment 1-3

In Embodiment 1-3, HARQ-ACK bits for reception of an SPS PDSCH without related DCI may be firstly arranged in ascending order or descending order of SPS indices, and secondary in ascending order of serving cell indices (the above-described (3)->(2)).

In this case, in a case of the example of FIG. 4A, $o_0^{ACK}$ to $o_3^{ACK}$ may correspond to the following:
- $o_0^{ACK}$: PDSCH #1, $o_1^{ACK}$: SPS #3, $o_2^{ACK}$: SPS #1, and $o_3^{ACK}$: SPS #2 ($o_1^{ACK}$ and $o_2^{ACK}$ are arranged in descending order of SPS indices), or
- $o_0^{ACK}$: PDSCH #1, $o_1^{ACK}$: SPS #1, $o_2^{ACK}$: SPS #3, and $o_3^{ACK}$: SPS #2 ($o_1^{ACK}$ and $o_2^{ACK}$ are arranged in ascending order of SPS indices).

In this case, in a case of the example of FIG. 5A, $o_0^{ACK}$ to $o_3^{ACK}$ may correspond to the following:
- $o_0^{ACK}$: PDSCH #1, $o_1^{ACK}$: SPS #2, $o_2^{ACK}$: SPS #1, and $o_3^{ACK}$: SPS #3 ($o_1^{ACK}$ and $o_2^{ACK}$ are arranged in descending order of SPS indices), or
- $o_0^{ACK}$: PDSCH #1, $o_1^{ACK}$: SPS #1, $o_2^{ACK}$: SPS #2, and $o_3^{ACK}$: SPS #3 ($o_1^{ACK}$ and $o_2^{ACK}$ are arranged in ascending order of SPS indices).

In this case, in a case of the example of FIG. 6A, $o_0^{ACK}$ to $o_3^{ACK}$ may correspond to the following:
- $o_0^{ACK}$: PDSCH #1, $o_1^{ACK}$: SPS #3, $o_2^{ACK}$: SPS #2, and $o_3^{ACK}$: SPS #1 ($o_2^{ACK}$ and $o_3^{ACK}$ are arranged in descending order of SPS indices), or
- $o_0^{ACK}$: PDSCH #1, $o_1^{ACK}$: SPS #3, $o_2^{ACK}$: SPS #1, and $o_3^{ACK}$: SPS #2 ($o_2^{ACK}$ and $o_3^{ACK}$ are arranged in ascending order of SPS indices).

Supplemental Remarks on First Embodiment

Note that the first embodiment describes an example in which HARQ-ACK bits corresponding to each SPS PDSCH are continuous (adjacent) bits, but this is not restrictive. For example, in the HARQ-ACK codebook to be transmitted by using a PUCCH, another HARQ-ACK bit (e.g., HARQ-ACK for an SPS PDSCH related to activation DCI, an HARQ-ACK bit corresponding to an SPS release, an HARQ-ACK bit corresponding to a dynamic PDSCH, or the like) may be arranged between an HARQ-ACK bit corresponding to a certain SPS PDSCH and an HARQ-ACK bit corresponding to another certain SPS PDSCH.

In other words, the order of the HARQ-ACK bits described in the first embodiment may be an order in a case where only HARQ-ACK bits corresponding to respective SPS PDSCHs are observed.

As described above, according to the first embodiment, it is possible to appropriately determine the order of the HARQ-ACK bits for the SPS PDSCH contained in the HARQ-ACK codebook. As long as the base station understands the rule of the order, there is no misunderstanding of the codebook between the UE and the base station, and thus it is possible to appropriately control transmitting and receiving processes.

Second Embodiment

A second embodiment relates to a determination of a PUCCH resource for transmission of HARQ-ACK in a case where the order rule of the HARQ-ACK for an SPS described in the first embodiment is applied.

In the second embodiment, a UE determines a PUCCH resource for transmission of an HARQ-ACK codebook containing only HARQ-ACK for an SPS PDSCH without related DCI on the basis of specific (e.g., the first or last) SPS PDSCH reception related to the HARQ-ACK codebook.

The UE may determine the above-described PUCCH resource on the basis of PUCCH resource information (e.g., an RRC parameter "n1PUCCH-AN") included in an SPS configuration corresponding to the specific SPS PDSCH.

In the second embodiment, the UE judges this specific SPS PDSCH reception (e.g., the first, last, or n-th SPS PDSCH reception) on the basis of an order of HARQ-ACKs for SPS PDSCHs included in the HARQ-ACK codebook. For example, when determining the PUCCH resource on the basis of the last SPS PDSCH reception, the UE may determine the PUCCH resource on the basis of an SPS PDSCH corresponding to the last HARQ-ACK out of the HARQ-ACKs for the SPS PDSCHs included in the HARQ-ACK codebook.

The second embodiment will be described in greater detail in embodiments below.

Embodiment 2-1

Embodiment 2-1 corresponds to the order of Embodiment 1-1.

Figure 9A:
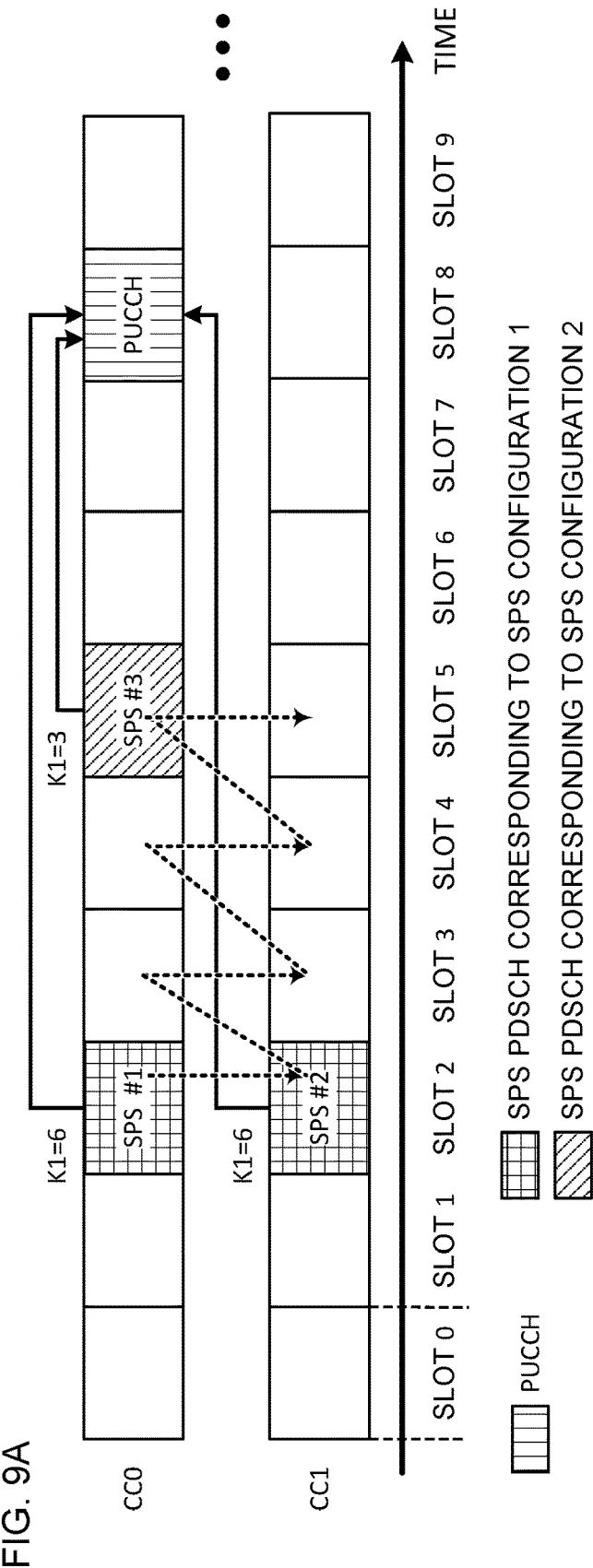
FIGS. 9A and 9B are diagrams to show an example of PUCCH resources according to Embodiment 2-1.
Figure 9B:
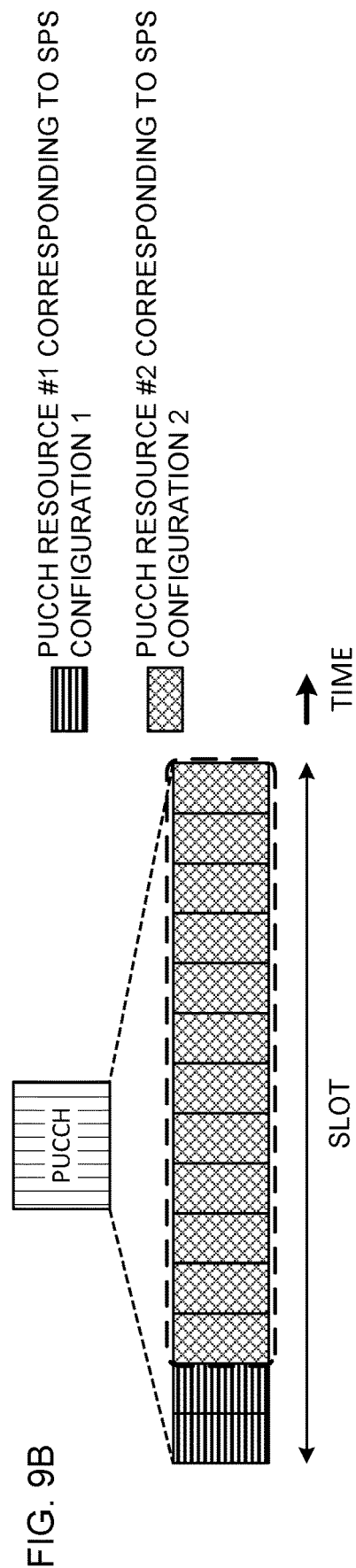

FIGS. 9A and 9B are diagrams to show an example of the PUCCH resources according to Embodiment 2-1. FIG. 9A is an example similar to FIG. 3A, but differs from FIG. 3A with regard to DCI format 1_1 and a corresponding PDSCH not being transmitted. In other words, the UE transmits, on a PUCCH of FIG. 9A, the HARQ-ACK codebook containing only HARQ-ACKs for SPS PDSCHs (SPS #1 to #3) without related DCI.

FIG. 9B is a diagram to show the PUCCH resource determined for transmission of the PUCCH of FIG. 9A. FIG. 9B shows each of PUCCH resources (PUCCH resources #1 and #2) corresponding to two SPS configurations to be configured.

The HARQ-ACK codebook transmitted on the PUCCH of FIG. 9A corresponds to the HARQ-ACK bits of FIG. 3B except the HARQ-ACK bit for PDSCH #1. Thus, the last SPS PDSCH reception is SPS #3. SPS #3 corresponds to SPS configuration 2, and thus the UE may transmit the above-described HARQ-ACK codebook by using PUCCH resource #2 corresponding to SPS configuration 2.

FIGS. 10A and 10B are diagrams to show another example of the PUCCH resources according to Embodiment 2-1. FIG. 10A is an example similar to FIG. 4A, but differs from FIG. 4A with regard to DCI format 1_1 and a corresponding PDSCH not being transmitted. In other words, the UE transmits, on a PUCCH of FIG. 10A, the HARQ-ACK codebook containing only HARQ-ACKs for SPS PDSCHs (SPS #1 to #3) without related DCI.

FIG. 10B is a diagram to show the PUCCH resource determined for transmission of the PUCCH of FIG. 10A. FIG. 10B shows each of PUCCH resources (PUCCH resources #1 to #3) corresponding to three SPS configurations to be configured. In the present example, a time resource of PUCCH resource #1 is symbols #0 and #1 in a slot, a time resource of PUCCH resource #2 is symbols #2 and #3 in the slot, and a time resource of PUCCH resource #3 is symbols #4 to #13 in the slot, but PUCCH resources to be configured are not limited to these.

The HARQ-ACK codebook transmitted on the PUCCH of FIG. 10A corresponds to the HARQ-ACK bits of FIG. 4B except a HARQ-ACK bit for PDSCH #1. Thus, the last SPS PDSCH reception is SPS #3. SPS #3 corresponds to SPS configuration 3, and thus the UE may transmit the above-described HARQ-ACK codebook by using PUCCH resource #3 corresponding to SPS configuration 3.

FIGS. 11A and 11B are diagrams to show still another example of the PUCCH resources according to Embodiment 2-1. FIG. 11A is an example similar to FIG. 5A, but differs from FIG. 5A with regard to DCI format 1_1 and a corresponding PDSCH not being transmitted. In other words, the UE transmits, on a PUCCH of FIG. 11A, the HARQ-ACK codebook containing only HARQ-ACKs for SPS PDSCHs (SPS #1 to #3) without related DCI.

FIG. 11B is a diagram to show the PUCCH resource determined for transmission of the PUCCH of FIG. 11A. FIG. 11B shows each of PUCCH resources (PUCCH resources #1 to #3) corresponding to three SPS configurations to be configured.

The HARQ-ACK codebook transmitted on the PUCCH of FIG. 11A corresponds to the HARQ-ACK bits of FIG. 5B except a HARQ-ACK bit for PDSCH #1. Thus, the last SPS PDSCH reception is SPS #2. SPS #2 corresponds to SPS configuration 2, and thus the UE may transmit the above-described HARQ-ACK codebook by using PUCCH resource #2 corresponding to SPS configuration 2.

Embodiment 2-2

Embodiment 2-2 corresponds to the order of Embodiment 1-2.

Figure 12A:
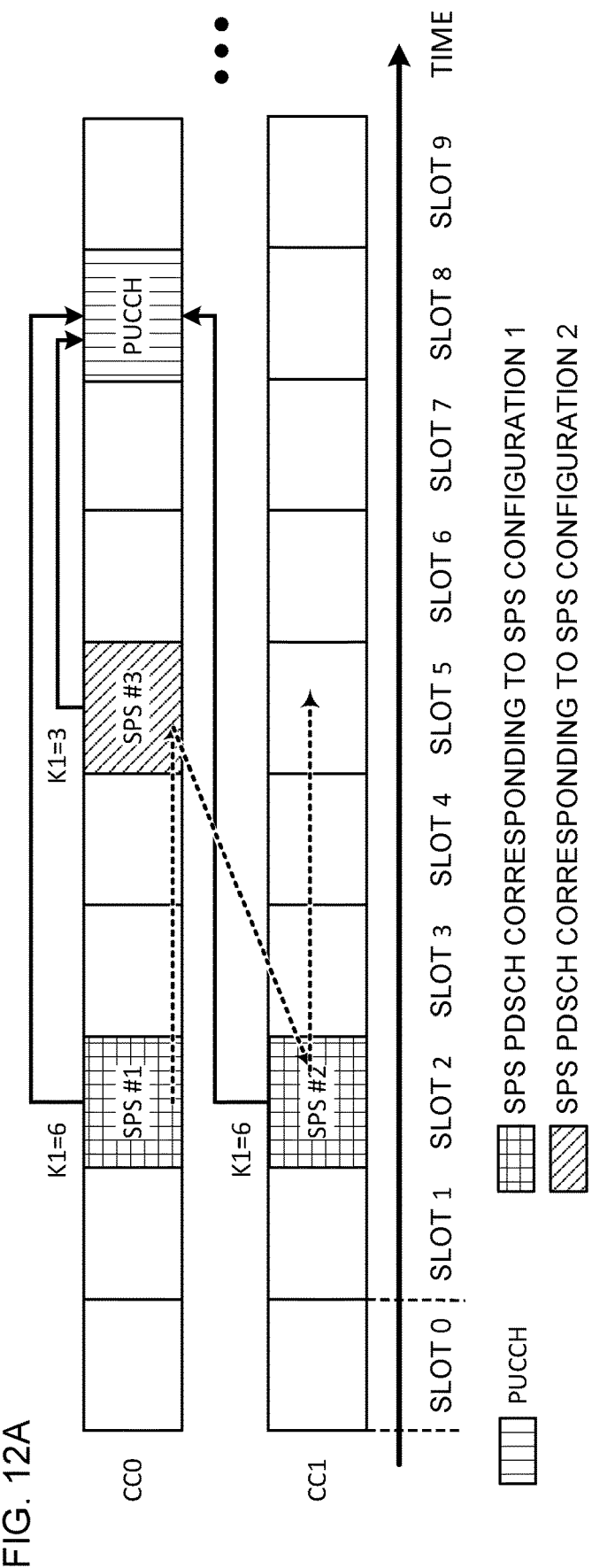
FIGS. 12A and 12B are diagrams to show an example of PUCCH resources according to Embodiment 2-1.
Figure 12B:
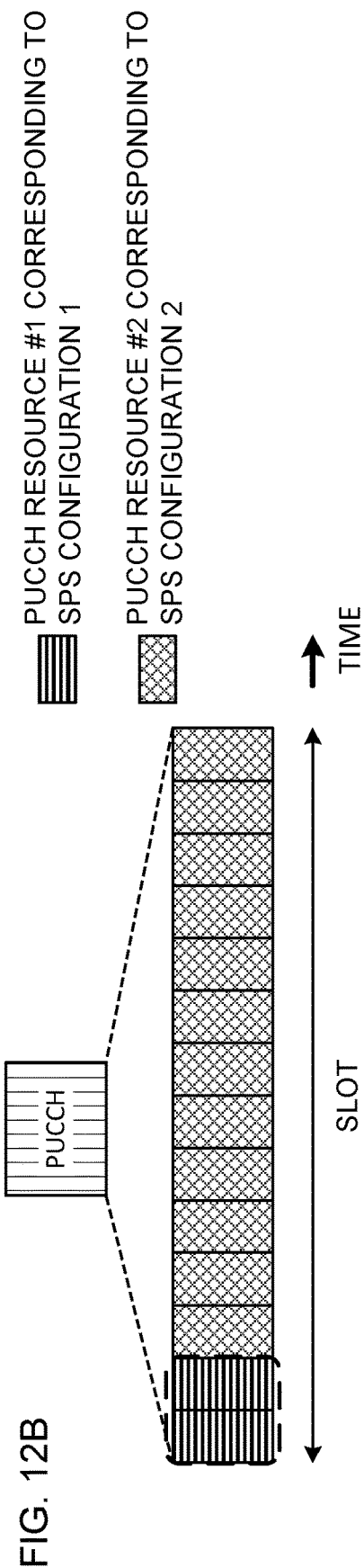

FIGS. 12A and 12B are diagrams to show an example of the PUCCH resources according to Embodiment 2-2. FIG. 12A is an example similar to FIG. 6A, but differs from FIG. 6A with regard to DCI format 1_1 and a corresponding PDSCH not being transmitted. In other words, the UE transmits, on a PUCCH of FIG. 12A, the HARQ-ACK codebook containing only HARQ-ACKs for SPS PDSCHs (SPS #1 to #3) without related DCI.

FIG. 12B is a diagram to show the PUCCH resource determined for transmission of the PUCCH of FIG. 12A. FIG. 12B shows each of PUCCH resources (PUCCH resources #1 and #2) corresponding to two SPS configurations to be configured.

The HARQ-ACK codebook transmitted on the PUCCH of FIG. 12A corresponds to the HARQ-ACK bits of FIG. 6B except a HARQ-ACK bit for PDSCH #1. Thus, the last SPS PDSCH reception is SPS #2. SPS #2 corresponds to SPS configuration 1, and thus the UE may transmit the above-described HARQ-ACK codebook by using PUCCH resource #1 corresponding to SPS configuration 2.

FIGS. 13A and 13B are diagrams to show another example of the PUCCH resources according to Embodiment 2-1. FIG. 13A is an example similar to FIG. 7A, but differs from FIG. 7A with regard to DCI format 1_1 and a corresponding PDSCH not being transmitted. In other words, the UE transmits, on a PUCCH of FIG. 13A, the HARQ-ACK codebook containing only HARQ-ACKs for SPS PDSCHs (SPS #1 to #3) without related DCI.

FIG. 13B is a diagram to show the PUCCH resource determined for transmission of the PUCCH of FIG. 13A. FIG. 13B shows each of PUCCH resources (PUCCH resources #1 to #3) corresponding to three SPS configurations to be configured.

The HARQ-ACK codebook transmitted on the PUCCH of FIG. 13A corresponds to the HARQ-ACK bits of FIG. 7B except a HARQ-ACK bit for PDSCH #1. Thus, the last SPS PDSCH reception is SPS #3. SPS #3 corresponds to SPS configuration 3, and thus the UE may transmit the above-described HARQ-ACK codebook by using PUCCH resource #3 corresponding to SPS configuration 3.

FIGS. 14A and 14B are diagrams to show still another example of the PUCCH resources according to Embodiment 2-1. FIG. 14A is an example similar to FIG. 8A, but differs from FIG. 8A with regard to DCI format 1_1 and a corresponding PDSCH not being transmitted. In other words, the UE transmits, on a PUCCH of FIG. 14A, the HARQ-ACK codebook containing only HARQ-ACKs for SPS PDSCHs (SPS #1 to #3) without related DCI.

FIG. 14B is a diagram to show the PUCCH resource determined for transmission of the PUCCH of FIG. 14A. FIG. 14B shows each of PUCCH resources (PUCCH resources #1 to #3) corresponding to three SPS configurations to be configured.

The HARQ-ACK codebook transmitted on the PUCCH of FIG. 14A corresponds to the HARQ-ACK bits of FIG. 8B except a HARQ-ACK bit for PDSCH #1. Thus, the last SPS PDSCH reception is SPS #2. SPS #2 corresponds to SPS configuration 2, and thus the UE may transmit the above-described HARQ-ACK codebook by using PUCCH resource #2 corresponding to SPS configuration 2.

Embodiment 2-3

Embodiment 2-3 corresponds to the order of Embodiment 1-3.

In a case as shown in FIG. 9A corresponding to FIG. 4A, the last SPS PDSCH reception is SPS #2. SPS #2 corresponds to SPS configuration 1, and thus the UE may transmit the HARQ-ACK codebook by using PUCCH resource #1 corresponding to SPS configuration 2.

In a case as shown in FIG. 10A corresponding to FIG. 5A, the last SPS PDSCH reception is SPS #3. SPS #3 corresponds to SPS configuration 3, and thus the UE may transmit the HARQ-ACK codebook by using PUCCH resource #3 corresponding to SPS configuration 3.

In a case as shown in FIG. 11A corresponding to FIG. 6A, the last SPS PDSCH reception is SPS #2. SPS #2 corresponds to SPS configuration 2, and thus the UE may transmit the HARQ-ACK codebook by using PUCCH resource #2 corresponding to SPS configuration 2.

As described above, according to the second embodiment, the UE can appropriately judge, on the basis of the order of the HARQ-ACK bits for the SPS PDSCHs contained in the HARQ-ACK codebook, the SPS PDSCH for determination of the PUCCH resource.

<Others>

Note that in addition to or in place of the PUCCH resource determination method described in the second embodiment, the UE may determine the PUCCH resource for transmission of the HARQ-ACK codebook containing only HARQ-ACKs for the SPS PDSCHs without related DCI in a similar manner to a method for determining a PUCCH resource for HARQ-ACK for a dynamic PDSCH.

The UE may determine the PUCCH resource for transmission of the HARQ-ACK codebook containing only HARQ-ACKs for the SPS PDSCHs without related DCI as described below. Firstly, a plurality of PUCCH resource sets may be configured for the UE by RRC signaling. Here, the PUCCH resource sets may be DL SPS-specific (dedicated) PUCCH resource sets, or may be PUCCH resource sets configured (available) for the dynamic PDSCH.

The UE may determine a PUCCH resource set to be utilized out of the above-described plurality of PUCCH resource sets on the basis of a payload size (bit length) of HARQ-ACK for a DL SPS.

The UE may determine, on the basis of a PUCCH resource indicator field in corresponding DCI (e.g., activation DCI), a PUCCH resource to be utilized out of one or a plurality of PUCCH resources contained in a PUCCH resource set, or may determine the PUCCH resource to be utilized in accordance with a given rule.

Note that the given rule may include a rule requiring selection of a PUCCH resource with a symbol that starts earlier, or may include a rule requiring selection of a PUCCH resource corresponding to a lower PUCCH resource index.

Note that when there are a plurality of pieces of corresponding DCI, the UE may determine the PUCCH resource on the basis of the PUCCH resource indicator field in specific DCI (e.g., the first DCI or the last (latest) DCI). Here, the specific DCI may be selected from activation DCI that has activated "specific SPS PDSCH reception" described in the second embodiment, or may be selected from activation DCI that has activated an SPS with a specific SPS configuration index (e.g., the lowest or highest SPS configuration index).

When more than one HARQ-ACK without related DCI is multiplexed on a PUCCH, the HARQ-ACK may be transmitted with a specific PUCCH resource. The specific PUCCH resource mentioned herein may be configured with one or a plurality of resources by higher layer signaling. The UE for which a plurality of specific PUCCH resources are configured may determine one specific PUCCH resource for transmission of the PUCCH on the basis of, for example, a coding rate of HARQ-ACK (UCI) to be transmitted.

Note that, in the present disclosure, the SPS occasion may be interchangeably interpreted as SPS reception.

Each of the above-mentioned embodiments describes an example in which slot boundaries (or frame boundaries) of a plurality of CCs match with each other, but a person skilled in the art will appreciate that contents of the present disclosure can be employed in a case where these do not match with each other.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 15:
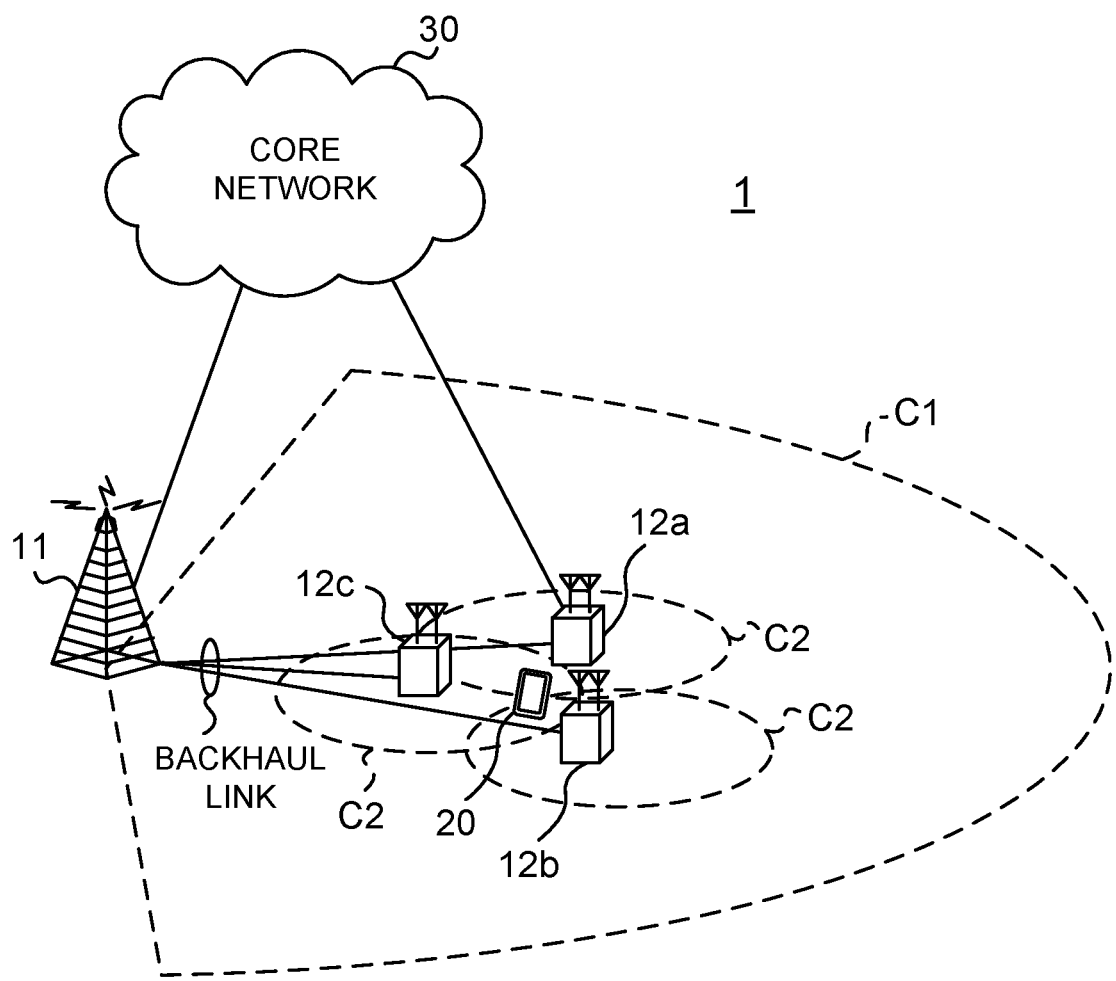
FIG. 15 is a diagram to show an example of a schematic structure of a radio communication system according to one embodiment.

FIG. 15 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (SGCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are transmitted on the PDSCH. User data, higher layer control information and so on may be transmitted on the PUSCH. The Master Information Blocks (MIBs) may be transmitted on the PBCH.

Lower layer control information may be transmitted on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data," and the PUSCH may be interpreted as "UL data."

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be transmitted by means of the PUCCH. By means of the PRACH, random access preambles for establishing connections with cells may be transmitted.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be transmitted. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be transmitted as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be transmitted as an uplink reference signal (UL-RS). Note that DMRS may be referred to as a "user terminal specific reference signal (UE-specific Reference Signal)."

(Base Station)

Figure 16:
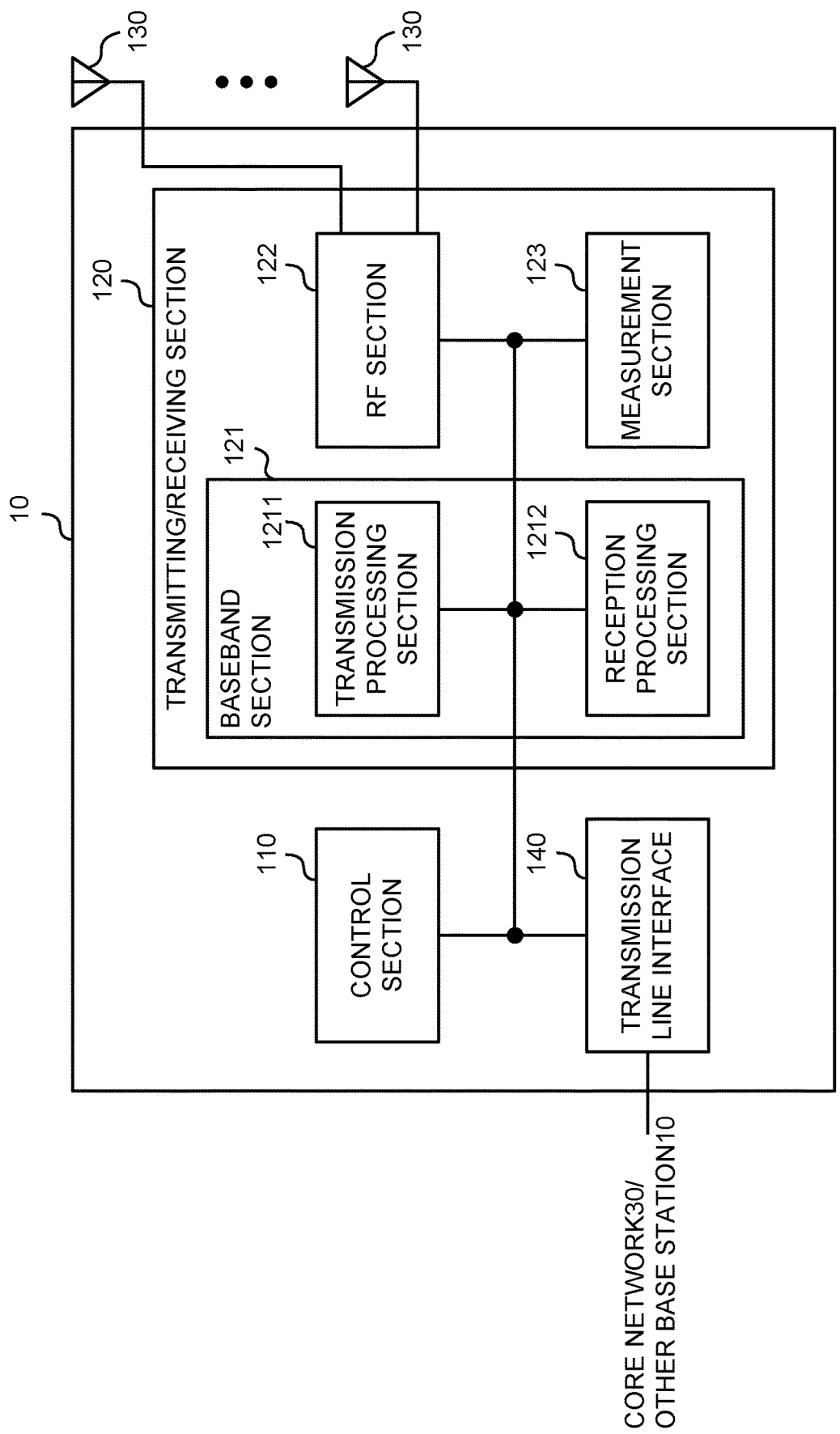
FIG. 16 is a diagram to show an example of a structure of a base station according to one embodiment.

FIG. 16 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

Note that the transmitting/receiving section 120 may receive an Hybrid Automatic Repeat reQuest ACKnowledgement (HARQ-ACK) information bit corresponding to an HARQ-ACK codebook containing only HARQ-ACK corresponding to a semi-persistent scheduling (SPS) downlink shared channel (Physical Downlink Shared Channel (PDSCH)) by using one uplink control channel (PUCCH).

(User Terminal)

Figure 17:
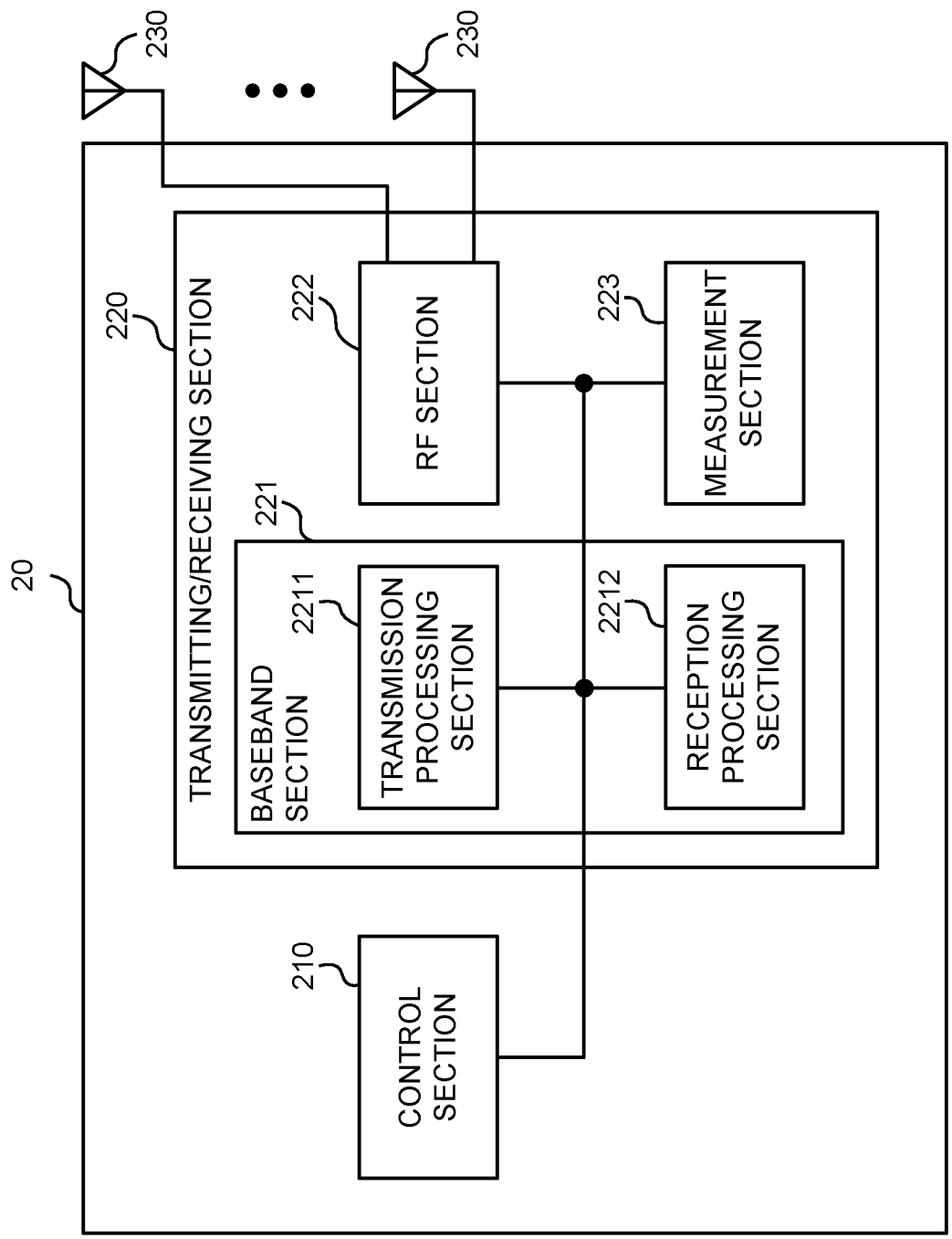
FIG. 17 is a diagram to show an example of a structure of a user terminal according to one embodiment.

FIG. 17 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be constituted as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (the RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (the RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (the measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the control section 210 may generate an Hybrid Automatic Repeat reQuest ACKnowledgement (HARQ-ACK) codebook containing only HARQ-ACK corresponding to a semi-persistent scheduling (SPS) downlink shared channel (Physical Downlink Shared Channel (PDSCH)) in a manner that an order of HARQ-ACK bits corresponding to respective SPS PDSCHs is in accordance with a given rule.

The HARQ-ACK codebook may be an HARQ-ACK codebook containing only HARQ-ACK for an SPS PDSCH without related DCI (e.g., activation DCI), may be an HARQ-ACK codebook containing only HARQ-ACK for an SPS PDSCH with related DCI, or may be an HARQ-ACK codebook containing both of these HARQ-ACKs.

The transmitting/receiving section 220 may transmit an HARQ-ACK information bit corresponding to the HARQ-ACK codebook by using an uplink control channel (PUCCH) resource based on an SPS (e.g., an SPS configuration for the SPS) corresponding to HARQ-ACK at a specific location in the order.

Note that the control section 210 and the transmitting/receiving section 220 may generate an HARQ-ACK codebook containing at least one of HARQ-ACK corresponding to an SPS PDSCH without related DCI, HARQ-ACK for an SPS PDSCH with related DCI, and HARQ-ACK corresponding to a dynamic PDSCH to transmit the codebook by using the same PUCCH.

Note that the given rule may be a rule requiring that firstly, an earlier SPS occasion be first, and secondary a lower cell index be first. The given rule may be a rule to which the rules (1) to (3) mentioned in relation to the first embodiment are applied in an arbitrary sequence.

The specific location may be at least one of the last, first, and n-th (n is an integer).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 18:
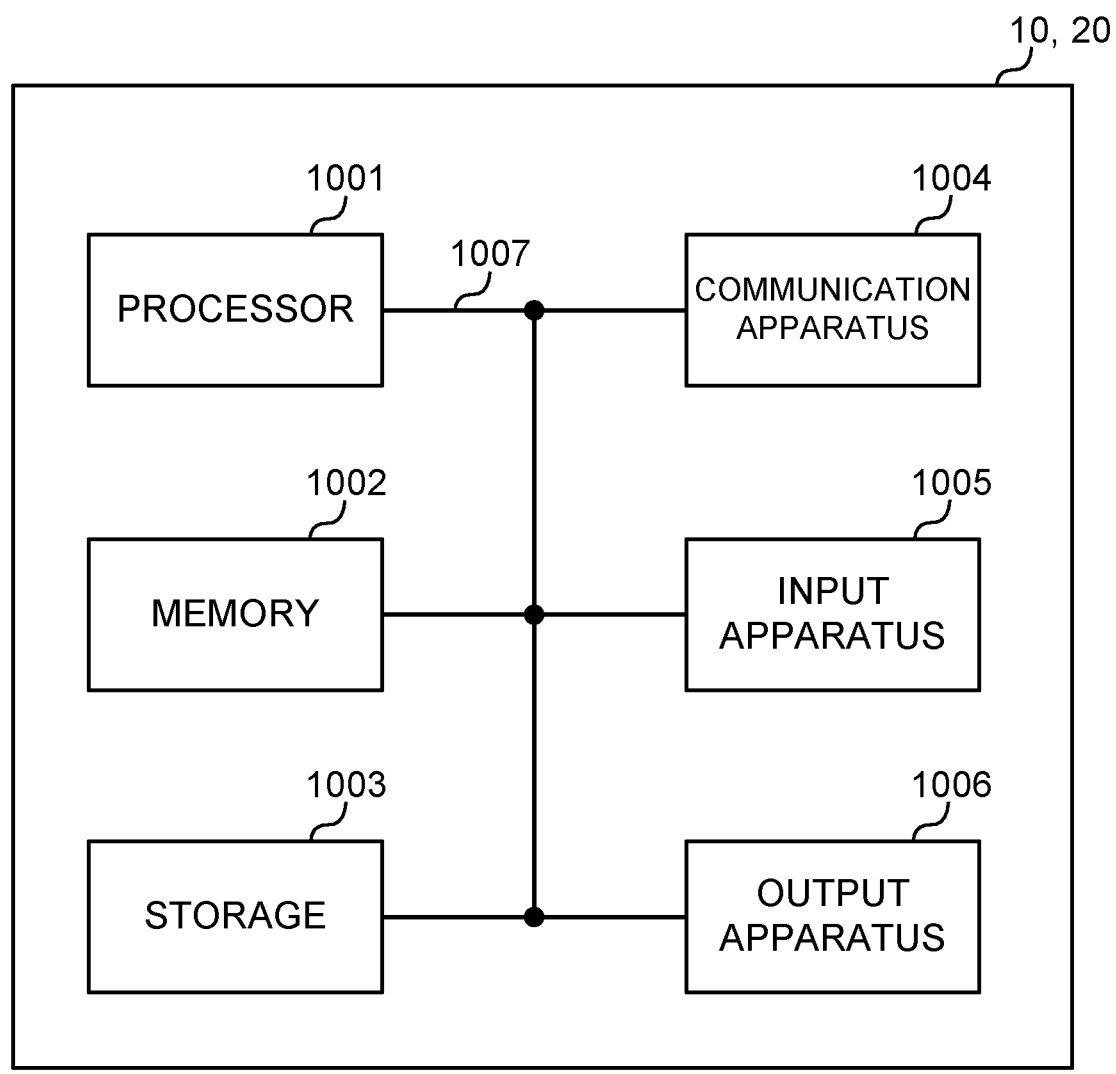
FIG. 18 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 18 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP."

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be indicated by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
    a processor that determines a hybrid automatic repeat request acknowledgement (HARQ-ACK) codebook, containing only HARQ-ACK information bits corresponding to a semi-persistent scheduling (SPS) physical downlink shared channel (PDSCH), so that the HARQ-ACK information bits corresponding to the PDSCH of each SPS are firstly ordered by earliest SPS reception, secondly ordered by smallest SPS configuration index, and thirdly ordered by smallest serving cell index; and
    a transmitter that transmits HARQ-ACK information corresponding to the HARQ-ACK codebook by using physical uplink control channel (PUCCH).

2. The terminal according to claim 1, wherein the processor determines, based on a size of the HARQ-ACK codebook, a resource of the PUCCH among a plurality of resources of the PUCCH only for SPS configured by radio resource control signaling.

3. A radio communication method for a terminal, the method comprising:
    determining a hybrid automatic repeat request acknowledgement (HARQ-ACK) codebook, containing only HARQ-ACK information bits corresponding to a semi-persistent scheduling (SPS) physical downlink shared channel (PDSCH), so that the HARQ-ACK information bits corresponding to the PDSCH of each SPS are firstly ordered by earliest SPS reception, secondly ordered by smallest SPS configuration index, and thirdly ordered by smallest serving cell index; and
    transmitting HARQ-ACK information corresponding to the HARQ-ACK codebook by using physical uplink control channel (PUCCH).

4. A base station comprising:
    a receiver that receives, by using a physical uplink control channel (PUCCH), hybrid automatic repeat request acknowledgement (HARQ-ACK) information corresponding to a HARQ-ACK codebook containing only HARQ-ACK information bits corresponding to a semi-persistent scheduling (SPS) physical downlink shared channel (PDSCH), wherein an order of the HARQ-ACK information bits corresponding to the PDSCH of each SPS is determined, so that the HARQ-ACK information bits are firstly ordered by earliest SPS reception, secondly ordered by smallest SPS configuration index, and thirdly ordered by smallest serving cell index; and
    a processor that performs a retransmission control based on the HARQ-ACK information.

5. A system comprising a terminal and a base station, wherein
    the terminal comprises:
        a processor of the terminal that determines a hybrid automatic repeat request acknowledgement (HARQ-ACK) codebook, containing only HARQ-ACK information bits corresponding to a semi-persistent scheduling (SPS) physical downlink shared channel (PDSCH), so that the HARQ-ACK information bits corresponding to the PDSCH of each SPS are firstly ordered by earliest SPS reception, secondly ordered by smallest SPS configuration index, and thirdly ordered by smallest serving cell index; and
        a transmitter that transmits HARQ-ACK information corresponding to the HARI)-ACK codebook by using a physical uplink control channel (PUCCH), and
    the base station comprises:
        a receiver that receives the HARQ-ACK information; and
        a processor of the base station that performs a retransmission control based on the HARQ-ACK information.

* * * * *